United States Patent [19]

Stanley et al.

[11] 4,451,883

[45] May 29, 1984

[54] BUS SOURCING AND SHIFTER CONTROL OF A CENTRAL PROCESSING UNIT

[75] Inventors: Philip E. Stanley, Westboro; William E. Woods, Natick; Richard A. Lemay, Carlisle; David E. Cushing, Chelmsford, all of Mass.

[73] Assignee: Honeywell Information Systems Inc., Waltham, Mass.

[21] Appl. No.: 326,260

[22] Filed: Dec. 1, 1981

[51] Int. Cl.³ ............................ G06F 9/12; G06F 9/20
[52] U.S. Cl. .................................................. 364/200
[58] Field of Search ............................ 364/200, 900

[56] References Cited

U.S. PATENT DOCUMENTS

| | | | |
|---|---|---|---|
| 4,189,768 | 2/1980 | Liptay et al. | 364/200 |
| 4,205,372 | 5/1980 | Gruner | 364/200 |
| 4,206,503 | 6/1980 | Woods et al. | 364/200 |
| 4,219,874 | 8/1980 | Gusev et al. | 364/200 |
| 4,258,419 | 3/1981 | Blahut et al. | 364/200 |
| 4,268,909 | 5/1981 | Kindell et al. | 364/200 |

*Primary Examiner*—Eddie P. Chan
*Assistant Examiner*—Daniel K. Dorsey
*Attorney, Agent, or Firm*—George Grayson; Nicholas Prasinos

[57] ABSTRACT

A data processing system includes a memory subsystem for storing operands and instructions and a central processing unit (CPU) for manipulating the operands by executing the instructions. The CPU includes a control store for generating signals for controlling the CPU operation. Shifters made up of multiplexers shift operands between an outer bus and a write bus in response to control store signals. The multiplexers shift the operands left or right 1, 2 or 4-bit positions including open shifts and circular shifts and also perform byte position shifting and twinning.

12 Claims, 10 Drawing Figures

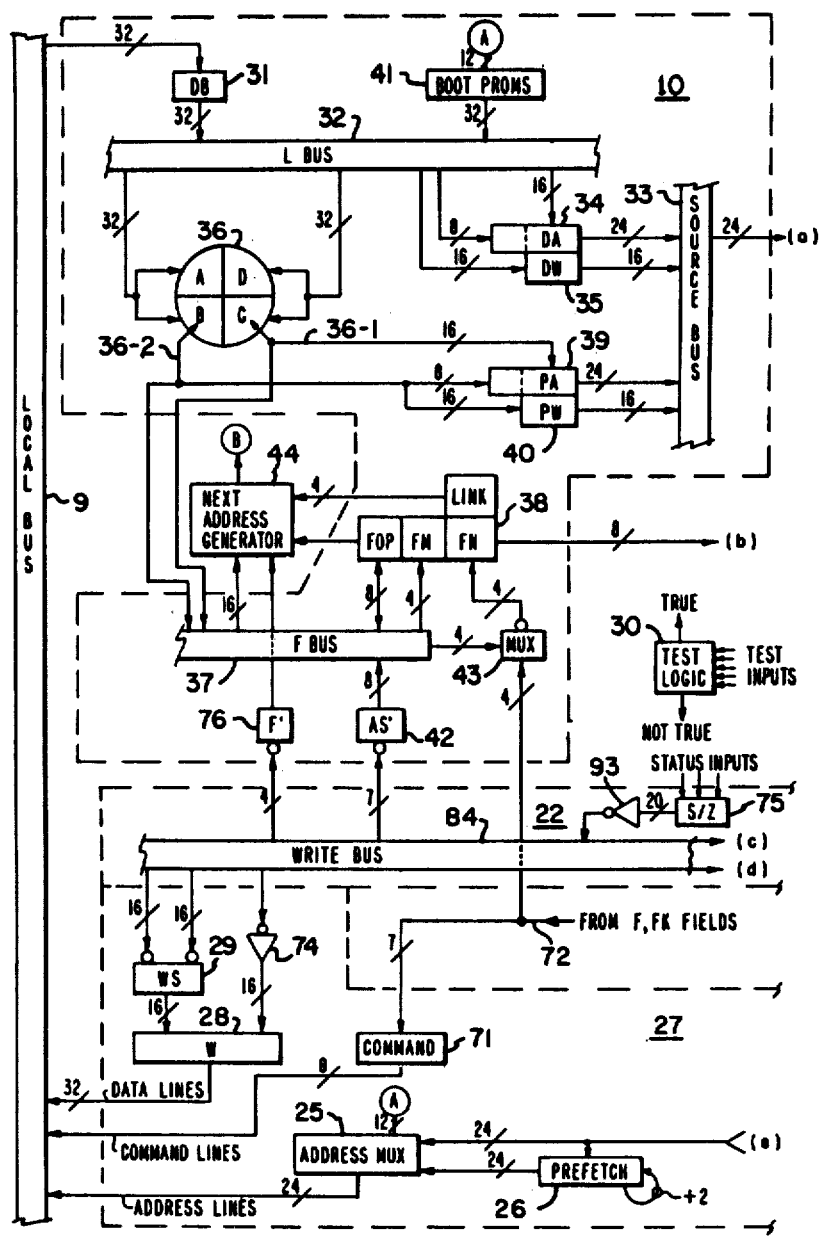
FIG. 2 SHEET 1 OF 2

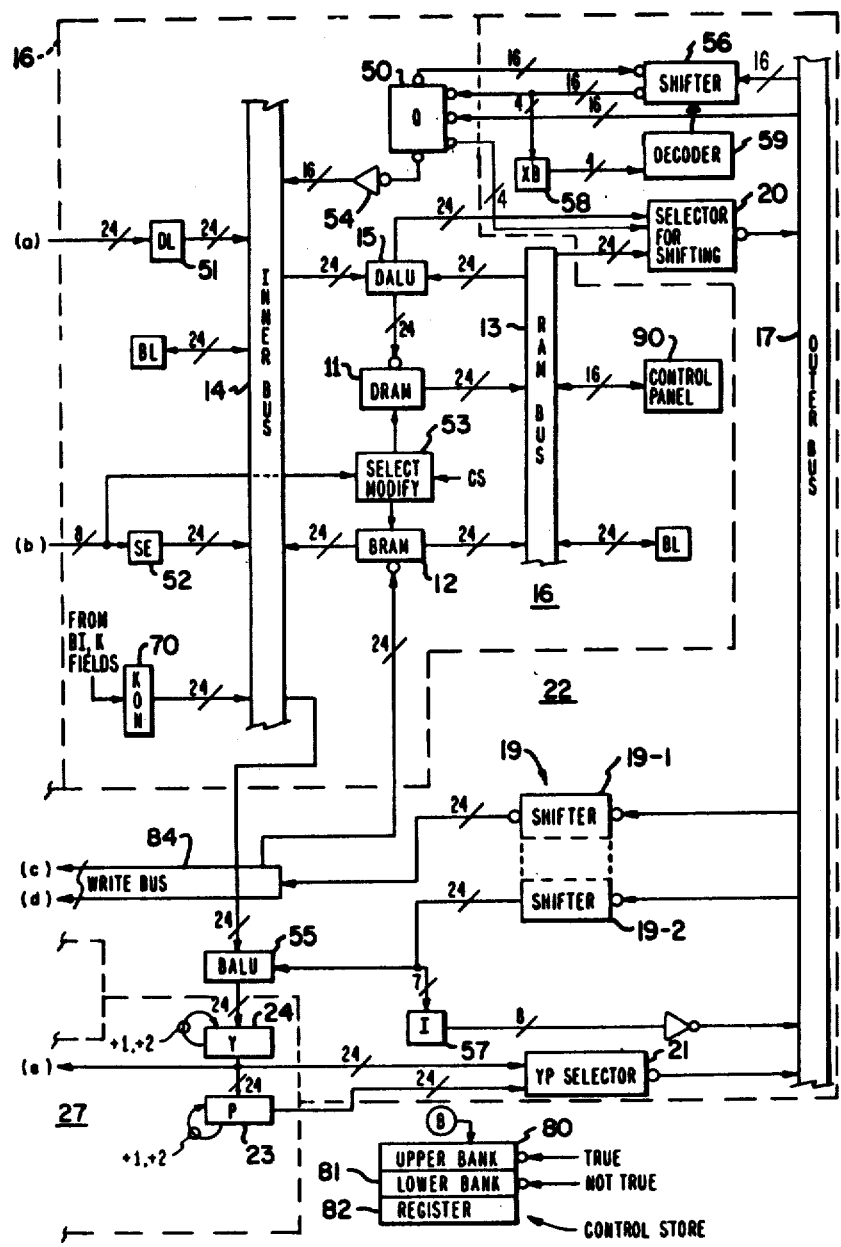
FIG. 2 SHEET 2 OF 2

| | MUX 19-8 THROUGH MUX 19-31 OPERATIVE TERMINAL | SHIFT BIT POSITIONS | SIGNAL (BINARY VALUE) | | | | OPERAND SIZE (FOR ADDRESS GENERATION) |
|---|---|---|---|---|---|---|---|
| | | | CDBSD2+ | CDBSD1+ | CDMSD0+ | CDRSD0+ | |
| a. | 1 | 4 RIGHT | 1 | 0 | 0 | 0 | BIT |
| b. | 2 | 2 RIGHT | 0 | 1 | 0 | 0 | DIGIT |
| c. | 3 | 1 RIGHT | 1 | 1 | 0 | 0 | HALF WORD |
| d. | 4 | 0 | 0 | 0 | 1 | 1 | FULL WORD |
| e. | 5 | 1 LEFT | 1 | 0 | 1 | 1 | DOUBLE WORD |
| f. | 6 | 2 LEFT | 0 | 1 | 1 | 1 | QUAD WORD |
| g. | 7 | 4 LEFT | 1 | 1 | 1 | 1 | |
| | | SWAP MODE OBUS17→WBUS84 | | | | | |
| h. | 0 | RRM → LMR | 0 | 0 | 0 | 0 | |
| i. | 0/4 | RRR → LMR | 0 | 0 | 0 | 1 | |

FIG. 10

BUS SOURCING AND SHIFTER CONTROL OF A CENTRAL PROCESSING UNIT

RELATED APPLICATIONS

The following U.S. patent applications which are assigned to the same assignee as the instant application are related to the instant application and are incorporated herein by reference.

1. "Microprogrammed Control of Extended Integer Instructions Through Use of a Data Type Field in a Central Processor Unit" by William E. Woods and Philip E. Stanley, having U.S. Ser. No. 326,442 and filed on Dec. 1, 1981.

2. "A Multiword Memory Data Storage and Addressing Technique and Apparatus" by David E. Cushing and Philip E. Stanley, having U.S. Ser. No. 280,720 and filed on July 6, 1981.

3. "Control Store Test Selection Logic for a Data Processing System" by William E. Woods, David E. Cushing and Philip E. Stanley, having U.S. Pat. No. 4,348,723 and issued on Sept. 7, 1982.

4. "Address Pairing Apparatus for a Control Store of a Data Processing System" by David E. Cushing and Philip E. Stanley, having U.S. Pat. No. 4,348,724 and issued on Sept. 7, 1982.

5. "Control Store Organization for a Data Processing System" by Philip E. Stanley, David E. Cushing and Donald R. Taylor, having U.S. Pat. No. 4,360,869 and issued on Nov. 23, 1982.

6. "Buffer System for Supply Procedure Words to a Central Processor Unit" by William E. Woods, Philip E. Stanley, David E. Cushing and Richard A. Lemay, having U.S. Pat. No. 4,349,874 and issued on Sept. 14, 1982.

7. "Self-Evaluation System for Determining the Operational Integrity of a Data Processing System" by Elmer Wayne Carroll, Virendra S. Negi, Arthur Peters and Richard P. Brown, having U.S. Pat. No. 4,322,846 and issued on Mar. 30, 1982.

8. "Local Bus Interface for Controlling Information Transfer Between Units in a Central Subsystem" by Arthur Peters, Virendra S. Negi, David E. Cushing, Richard P. Brown and Thomas F. Joyce, having U.S. Pat. No. 4,323,967 and issued on Apr. 6, 1982.

9. "Stack Mechanism with the Ability to Dynamically Alter the Size of a Stack in a Data Processing System" by Philip E. Stanley and P. Szorc, having U.S. Ser. No. 140,624 and filed on Apr. 15, 1980 which was abandoned on Sept. 30, 1982 and continued as U.S. Ser. No. 430,488 with the filing data of Sept. 30, 1982.

10. "Interface for Controlling Information Transfers Between Main Data Processing Units and a Central Subsystem" by George J. Barlow, Philip E. Stanley and Richard P. Brown, having U.S. Pat. No. 4,371,928 and issued on Feb. 1, 1983.

BACKGROUND OF THE INVENTION

1. Field of the Invention

This invention relates generally to data processing systems and more particularly to the execution of shift instructions in a central processing unit.

2. Description of the Prior Art

Many present day processing systems include a central processing unit (CPU) that is firmware controlled. Also, many of the arithmetic operations performed by the CPU are implemented by microprocessors designed into the CPU. The requirement for shifting by the microprocessors wherein the bits were shifted one bit at a time required a large number of shift cycles with considerable firmware control. In addition, the manipulation of bytes and twinning required a considerable amount of hardware and special firmware control. Also, the process of address formation required a number of firmware cycles, due to the location of the shifting and byte swapping hardware relative to the internal CPU signal buses. U.S. Pat. No. 4,206,503 entitled "Multiple Length Address Formation in a Microprogrammed Data Processing System" is typical.

OBJECTS OF THE INVENTION

Accordingly, it is an object of the invention to provide a central processing unit having increased throughput.

It is another object of the invention to provide a central processing unit with improved apparatus for shifting operands during the execution of arithmetic instructions.

It is still another object of the invention to provide a central processing unit with improved apparatus for address preparation.

It is yet another object of the invention to provide a central processing unit with improved apparatus for byte shifting and twinning.

SUMMARY OF THE INVENTION

A data processing system includes a memory subsystem for storing operands and instructions, and a central processing unit (CPU) for manipulating the operands by executing the instructions. The CPU includes a control store for generating firmware signals which control the CPU operation, and a first random access memory (DRAM) and a second random access memory (BRAM) which generate signals which are applied to a RAM bus (R bus). An arithmetic logic unit (DALU) receives signals from the R bus and a second data bus (IBUS) to generate signals which are applied to a first selector. The R bus signals are also applied to the first selector which selects either the R bus signals or the DALU signals and applies the signals to an outer bus (O bus).

Also, a Y register which stores the memory subsystem operand addresses and the P register which stores the memory subsystem instruction addresses generate signals which are applied to a second selector which applies the address signals to the O bus.

A write bus (W bus) transfers operands to the BRAM, to the write data registers for transfer to the memory subsystem, and to a second arithmetic logic unit (BALU) for address manipulation. The O bus and the W bus are coupled by a first shifter which receives 24 O bus signals which it shifts either 0, 1, 2 or 4-bit positions left or right and transfers the shifted O bus signals to the W bus.

A second shifter receives 16 O bus signals for storage in a Q register. The 16 output signals from the Q register are applied to the second shifter, shifted 1, 2 or 4-bit positions left or right, and stored back in the Q register.

The first shifter includes 24 eight-to-one multiplexers (MUX 19-8 through MUX 19-31). The second shifter includes 16 eight-to-one multiplexers (MUX 56-16 through MUX 56-31). The first and second shifters may be coupled to form a 32-bit shifter (MUX 19-16 through MUX 56-31) by coupling the MUX 19-31 end of the first shifter with the MUX 56-16 end of the second shifter, and coupling the MUX 19-16 end of the first shifter to the MUX 56-31 end of the second shifter by shift end effects logic. The number of bit positions shifted is generated by the shift distance control logic which generates select signals which are applied to the first and second shifter multiplexers to select one of the eight input terminals. The particular input terminal selected will determine the shift distance 0, 1, 2 or 4-bit positions and the shift direction, left or right.

During an open shift, the shift end effects will place binary ZERO bits in each bit position from which the last bit was shifted. For example, an open right shift of 4 will result in 4 binary ZERO bits placed on the W bus in the W bus bit positions 16 through 19. During a circular right shift, the bits shifting off the right end of the second shifter will shift into the MUX 19-16 end of the first shifter. Similarly, in a circular left shift the bits shifting out of the MUX 19-16 end of the first shifter will shift into the MUX 56-31 end of the second shifter. In both the circular and open shifts, the shift end effects logic will transfer the bits between the MUX 19-31 end of the first shifter and the MUX 56-16 end of the second shifter.

The first shifter may operate as a 24-bit shifter when shifting the address signals from the P or Y registers one bit position left. It may also operate as a 16-bit shifter in MUX 19-16 through MUX 19-31 with the sign extended from MUX 19-8 through MUX 19-15.

The first shifter may also perform a right shift on 24-bit operands including a sign bit in the leftmost position. The multiplexers include signals to repeat the sign in each of the multiplexer positions to the left of the shifted sign bit.

The first shifter also includes signals for shifting bytes from one byte position to another and also duplicating (twinning) bytes and transferring them to the W bus. In addition, the shifter receives index values from the O bus which are added to a base address to generate a memory subsystem address. The index value is shifted by the first shifter a number of bit positions depending on the type of operand being addressed. 1-bit binary, 4-bit decimal digit or 8-bit half word operands are shifted right 4, 2 and 1-bit positions respectively through the second shifter. These bits are stored in an XB register and are used to identify 1 of 16 bits in a memory word, 1 of 4 decimal digits in a decimal digit word and 1 of 2 bytes in a word.

BRIEF DESCRIPTION OF THE DRAWINGS

The novel features which are characteristic of the invention are set forth with particularity in the appended claims. The invention itself, however, both as to organization and operation may best be understood by reference to the following description in conjunction with the drawings in which:

FIG. 2 is a detailed block diagram of the central processing unit of the present invention;

FIG. 10 is a table illustrating the output shift signals for the input control select signals applied to the shift multiplexers 19.

DESCRIPTION OF THE PREFERRED EMBODIMENT

Figure 1:
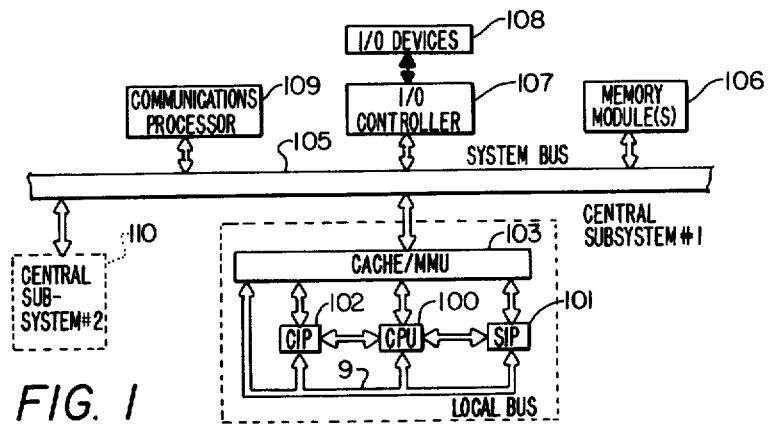
FIG. 1 is a general block diagram of the system in which the apparatus of the present invention is included.

FIG. 1 is a general block diagram of the configuration of the system in which the CPU to be described may be included. Such a system includes a central processor unit (CPU) 100, and optional processors which may include a scientific instruction processor (SIP) 101 and a commercial instruction processor (CIP) 102. These optional processors may be used to extend the range of the basic processor 100 for special applications. The system may also include a Cache/MMU (Cache memory/memory management unit) unit 103, an electrical system bus 105, memory modules (main memory) 106, input/output (I/O) controllers 107 coupled to I/O devices 108, and a multiline communications controller or processor (MLCP) 109. The system may also include a multiprocessor configuration in which there is a second central subsystem 110 which includes all or a portion of the above-described system.

The central subsystem processors are connected to each other by way of a local bus 9 and they are connected to the rest of the system by way of the Cache/MMU unit 103. The function of the Cache/MMU unit in the central subsystem is to provide a buffer storage for the portion of main memory 106 that is currently being used by the processors, and to provide for translation of the main memory address. The function of the local bus 9 is to provide an interconnection among the three processors and the Cache/MMU unit 103. As shown in FIG. 1, there are private interfaces between the CPU 100 and the other two processors. There is also a private interface from each processor to the Cache/MMU. The local bus 9 is a time-shared or public interface, that is, shared by all three processors and the Cache/MMU. In addition, the Cache/MMU 103 provides an interface via the system bus 105 to the rest of the system, primarily the memory 106 and the I/O devices 108 via controllers 107.

The CPU block diagram of FIG. 2 will now be discussed. More particularly, the various electrical buses and functional units and their interrelationships will be discussed. The primary elements of the CPU are shown within the dotted lines. A first such element is the local bus interface 10 which includes a data buffer 31, a round robin procedure storage buffer 36, and various procedure/data word and address multiplexers (MUX's) coupled with a source bus 33 as well as other devices to be discussed. The first element 10 is utilized for the purpose of receiving data from the system bus 105.

A second element 16 is the arithmetic element and includes several devices including two sets of register arrays (RAM's) called the DRAM 11 and the BRAM 12, and the RAM or R bus 13, to which RAM's 11 and 12 are connected. It also includes the input or inner bus (IBUS) 14 to which the BRAM 12, as well as other devices, connects. The second element also includes the DALU 15, i.e., the arithmetic logic unit, which is coupled to drive the DRAM 11.

A third element 22 of the CPU includes the Outer (O) bus 17 and the Write (W) bus 84, the shifters 19-1 and 19-2 which connect them, and the selectors which drive them. These selectors include the DALU/R bus selector 20 and the Y register/P register (YP) selector 21.

A fourth primary element 27 is the address section of the CPU and includes the procedure address register (P) 23 and the data address register (Y) 24. It also includes the address multiplexer 25 and the Prefetch address register 26. Also included in element 27 are the write data register (W) 28, and the write data selector (WS) 29. This portion of the CPU is utilized for the purpose of transferring data to the local bus 9.

Figure 5:
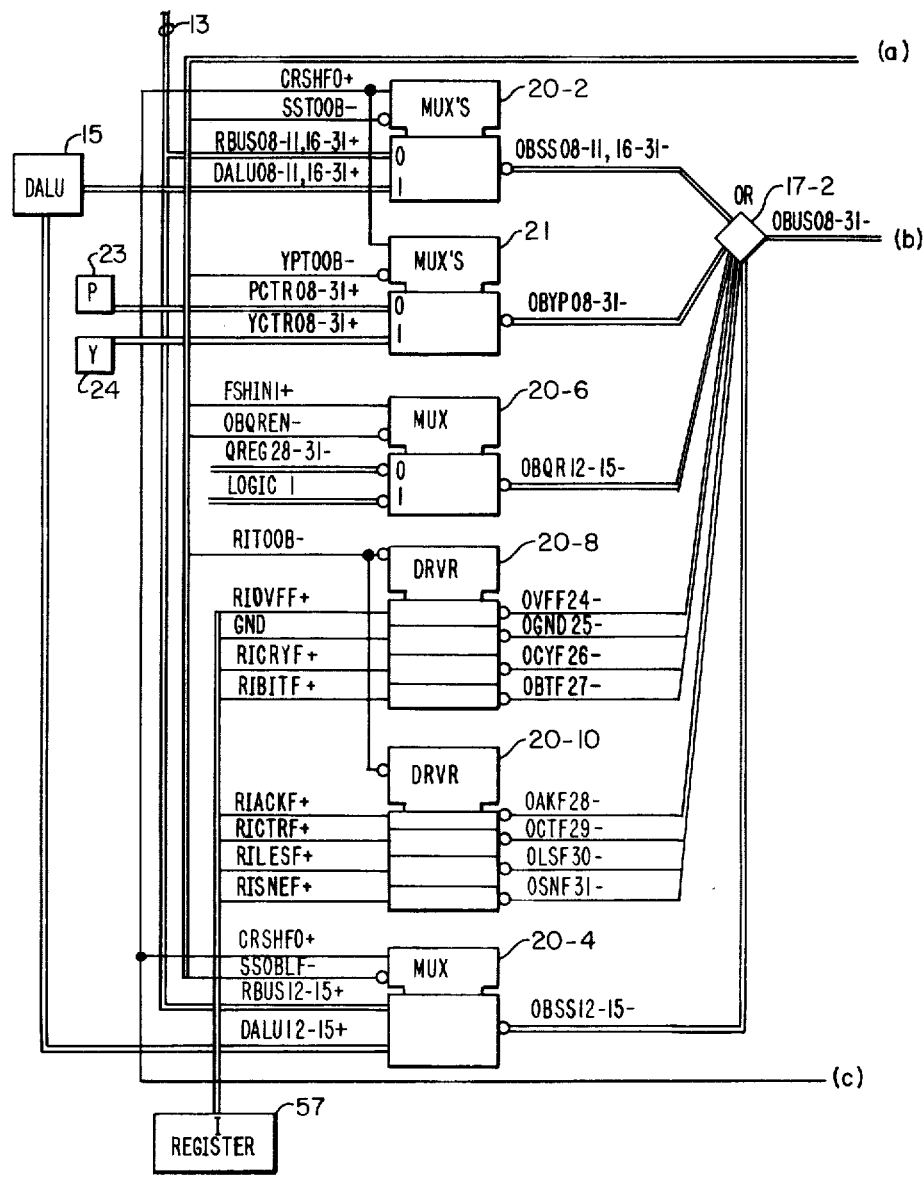
FIG. 5 is a logic block diagram of the shifting apparatus.
Figure 5:
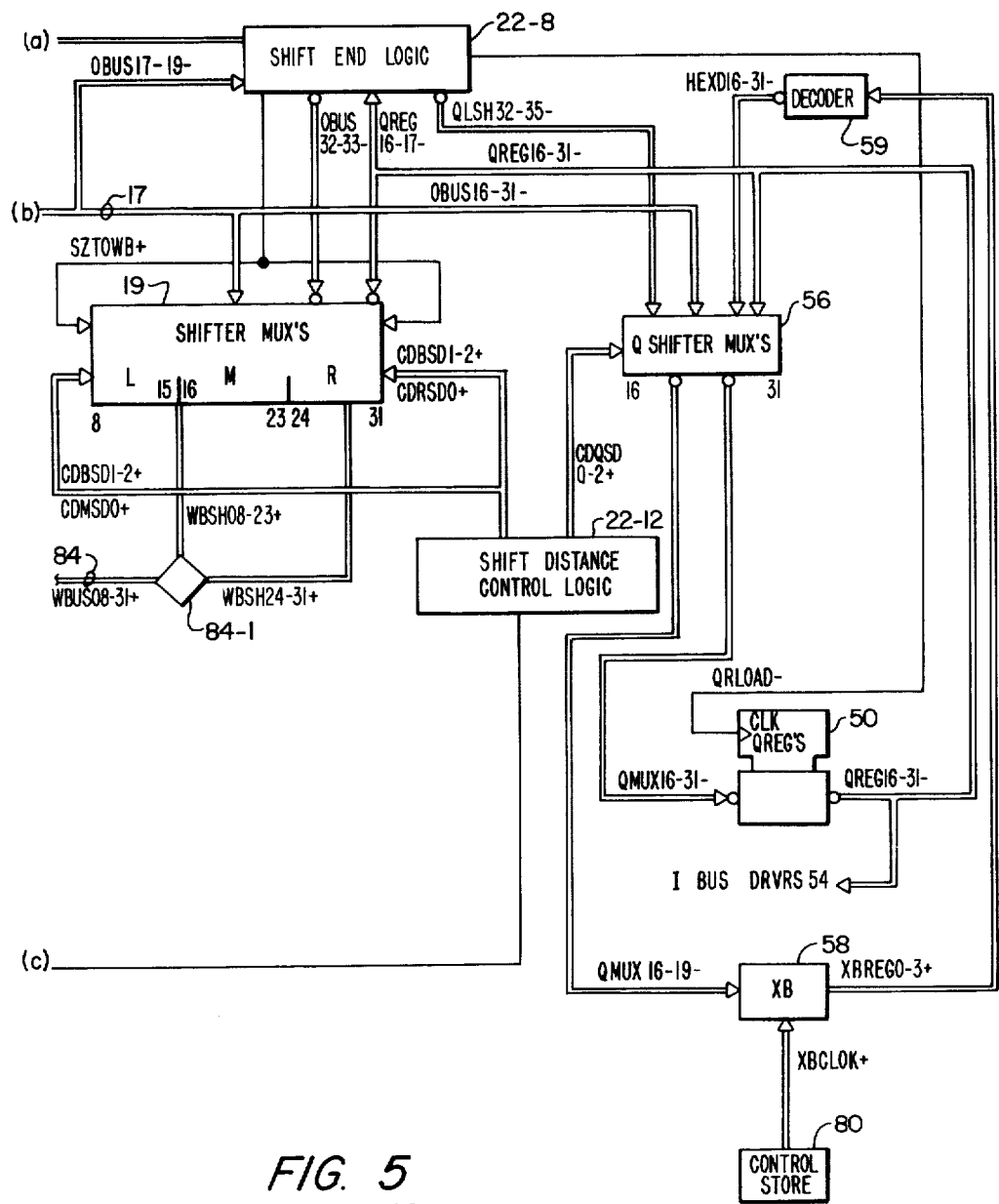
Figure 7:
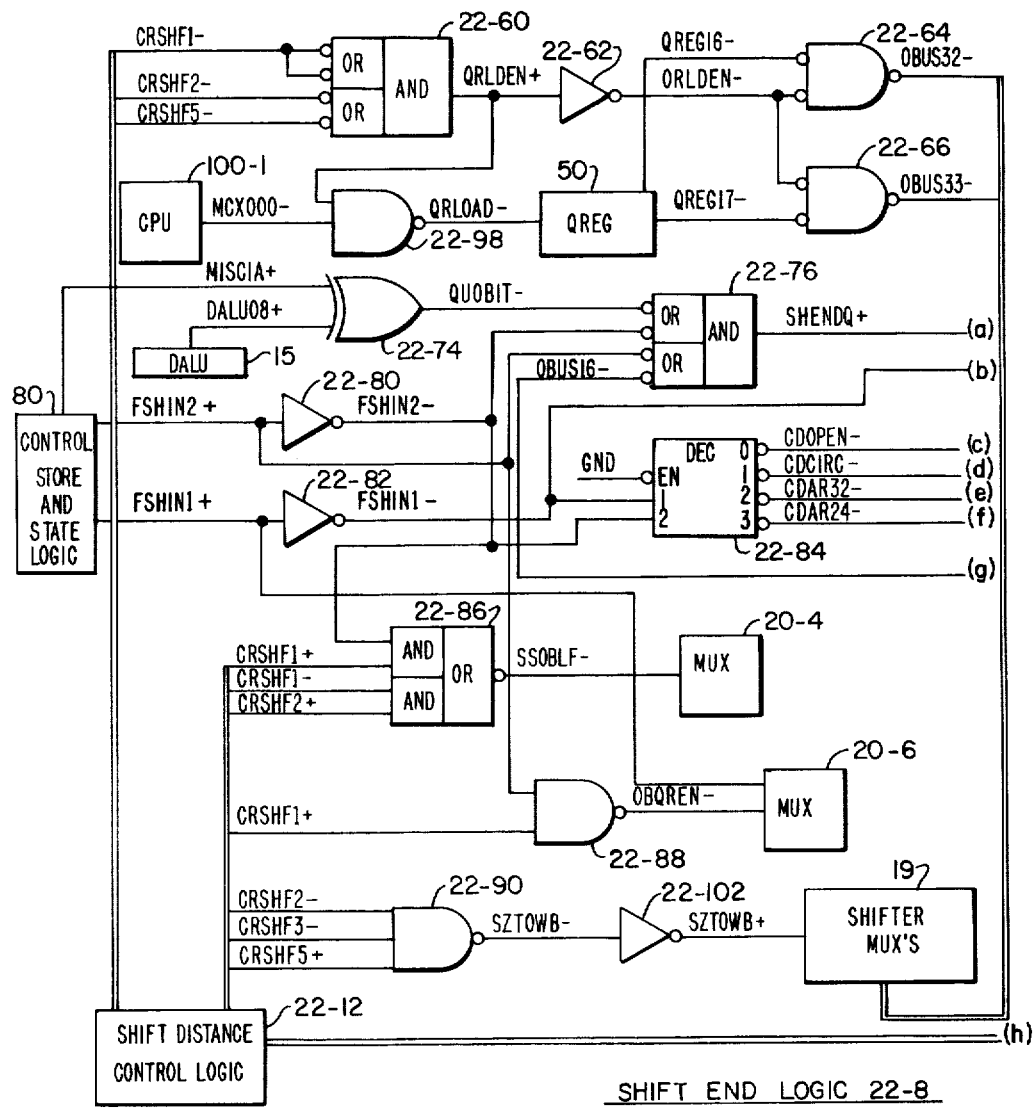
FIG. 7 is a logic diagram of the shift end logic 22-8.
Figure 7:
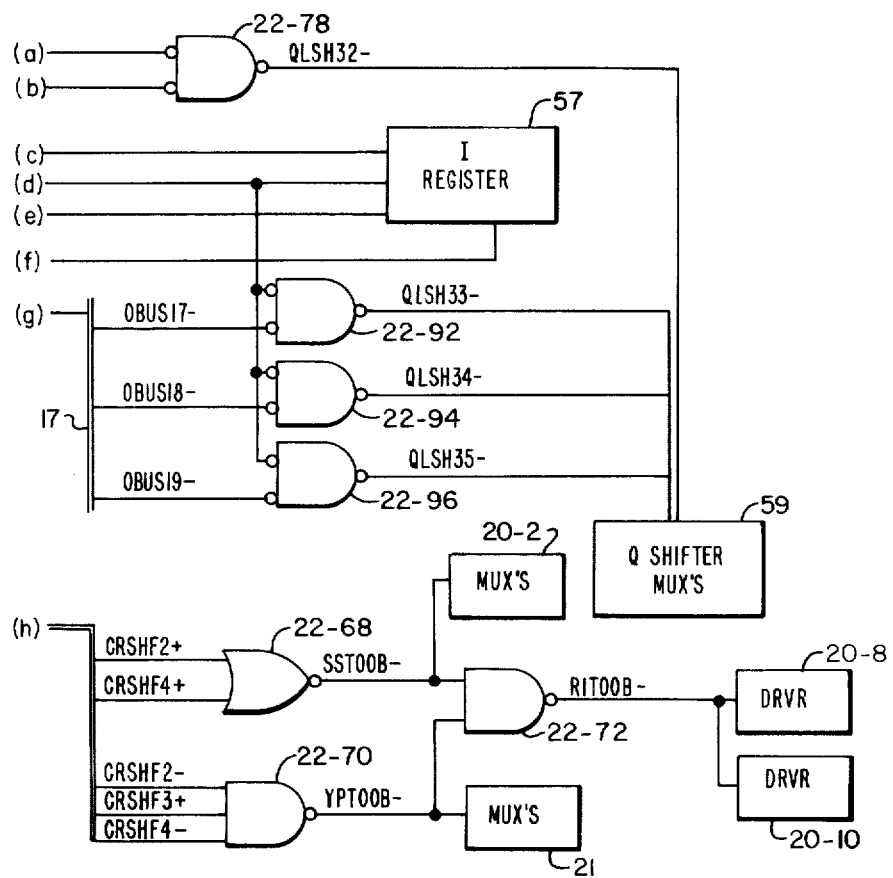

Device 30 is the test logic of the CPU, which is shown in FIG. 7, and includes a set of eight-to-one multiplexers which in turn drive a second set of at least two eight-to-one multiplexers which generate a single binary signal called "Test True" or "Test False", which is then used to control branching in the firmware. The Test True and False signals are coupled to the PROM's included in the control store banks 80 and 81 as shown in FIG. 5.

The next address generator 44 (FIG. 2) is coupled to the F register 38 and the F bus 37. The next address generator is primarily concerned with generating addresses for use in the CPU.

The function of element 10, which is the local bus data input area, is to receive data which is returning from the Cache/MMU 103 or from other devices on the local bus 9, to select data from the bootstrap PROM's 41 if a bootstrap procedure execution is requested, and to direct such data to the appropriate data buffer. If an instructional fetch is called for, for example, the data is placed in the function register. More particularly, the primary data buffer 31 receives 16 or 32-bit data words from the local bus 9. The output of the data buffer 31 is connected to the L bus 32. The L bus is used both to drive the source bus 33 by use of a pair of selectors DA 34 and DW 35 and to drive the four-word procedure buffer 36. Non-procedural data enters the CPU via the source bus 33 which is driven from the data selectors from the L bus 32.

Procedural data enters the CPU via a different set of selectors, PA 39 and PW 40, coming from the procedure buffer 36. The procedure buffer has the responsibility of containing the next two or three words of the procedure to be executed, so that when they are required, time will not have to be spent fetching them. It is automatically reloaded from the Cache/MMU 103 via the local bus 9 as it is emptied by the CPU.

The F bus 37 is a special bus which is used for gating information for the F register 38, i.e., the four areas labeled FOP, FM, FN and Link. The F register is the primary instruction register of the CPU. The function of the F bus 37 is to take data from the F register 38 and provide data to the F register from various sources. There is also a multiplexer 43 which allows the loading of either constants or data from element AS' 42 into either the Link or the FN location of the F register 38.

Also in the element 10, which is the data input area, the set of bootstrap PROM's 41 can be used to provide instructions, in place of instructions from memory, if operating in the bootstrap mode.

The storage device (procedure store) 36 having locations A, B, C, and D is a round robin four-word procedure store. Whenever it has room for two words of procedure, i.e., it is at least half empty, then it automatically initiates a memory read of procedure via the local bus 9, from the Cache/MMU. The returning data is dropped into the next two locations which are available in this round robin store. As the CPU uses procedures by either emitting it to the source bus 33 for use inside the processing elements of the CPU, or by sending it to the F register 38 because it is part of an instruction, then the two pointers 36-1 and 36-2, which represent in effect cursors in the round robin store, advance to the next location available by use of a conductor included in device 36 which successively enables the four locations to the outputs of device 36. The left-hand cursor or pointer 36-2 indicates the next word of procedure to be fetched; the right-hand cursor 36-1 represents the word following that. Sometimes one word of procedure is used up in which case the word indicated by the left-hand cursor would be used to generate the information, passing through the PW multiplexer 40. Sometimes there is a requirement for two words of procedure (as when pulling a large address form (LAF) address); then the words indicated by both the left-hand and the right-hand cursors are combined in the PA multiplexer 39 of the procedure selector.

Thus, element 10 is the area concerned with bringing data into the CPU through the source bus 33, via either data selectors 34 and 35, or the procedure selectors 39 and 40, or bringing data directly into the instruction (F) register 38 via the procedure buffer (round robin procedure store) 36 and the F bus 37. Device (F') 76 is used to hold selected bits from auxiliary address information or syllables. The address syllable is actually part of a 16-bit data descriptor. Certain bits in the descriptor have to be retained for subsequent analysis. The operand-size bit in the CIP descriptor and the operand size and signed versus unsigned bits in the K register descriptor have to be retained. These are retained in the 5-bit F' register 76.

The second element 16 contains the arithmetic logic unit (DALU) 15, the BRAM 12 and DRAM 11, containing all of the programmer visible registers, plus a number of non-programmer visible work registers. These data storage elements are organized as follows. The DRAM 11, which is one of the two sources which can drive the RAM bus 13, contains 32 locations, each of which is 24 bits wide. These locations are used to hold 7 so-called D registers, 2 halves (K and L) of the 7 so-called K registers which are 32 bits long, a number of internal pointers, and 7 so-called M registers. The BRAM 12 which contains 16 words, each 24 bits wide, contains the 7 base registers plus a number of programmer visible and programmer invisible pointers of various types.

Figure 3:
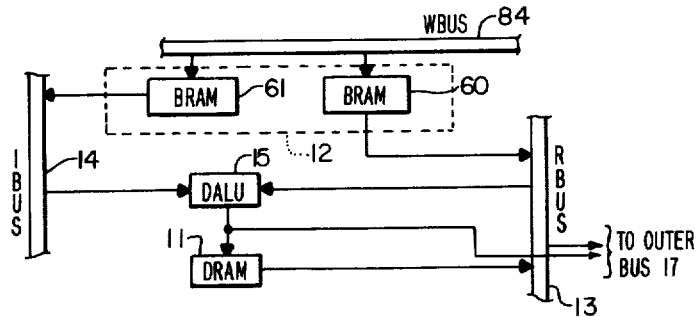
FIG. 3 illustrates details of the connections to the arithmetic logic of the central processing unit of the present invention.

FIG. 3 shows in more detail the relationship between the RAM's, the buses and the DALU 15. The DRAM 11 and the BRAM 12 can each be sources to the RAM bus 13. The BRAM 12 is actually a dual structure; that is, there are two parallel BRAM's 60 and 61 in the CPU. The two elements of the BRAM 12 are loaded identically. One such element which drives (or transfers data to) the R bus 13 is element 60, and the other which drives the I bus 14 is the BRAM element 61. The important aspect of the two identical BRAM's is that the system speed is increased.

The R bus 13 can be driven either by the BRAM 60 or by the DRAM 11. Other sources as will be seen also drive the I bus 14. The DALU 15 uses the I bus and the R bus as its inputs and the output of the DALU is then recycled to the DRAM and/or used elsewhere in the CPU.

Element 16 includes two buses of major interest. The so-called I bus 14 is the primary source of original input within the processor; that is, data from memory comes into this bus as does the output of the Q register 50 via driver 54 and the output of the BRAM 12. The second bus, the so-called R or RAM bus, is the point at which the outputs of the two different RAM's, the BRAM 12 and the DRAM 11, are coupled. The outputs of these two buses are the inputs to the DALU 15, which generates data which can either be returned into the DRAM 11 or sent to the O bus 17 for further processing in the system.

Both the I bus and the RAM bus employ a hardware element referred to as "batlatch" (BL) which is a gate whose input and output are tied together for coupling signals onto the bus. This batlatch is intended to take over control of that signal after the driving source is required to go off the bus for timing and sequencing reasons. When this happens, the batlatch then supports that signal at the same level as it was when the driving sources were present, until the batlatch is turned off at which time the bus signal can relax (go to a predetermined level such as zero volts).

The RAM bus 13 is the interface for the transfer of data between the control panel 90 and the central processing unit, and is connected to it via 16 bidirectional signal lines. Memory data is coupled to the I bus 14 via a set of drivers called the data latches (DL) 51. The data latches are paralleled by a second series of latches called SE or sign extension latches 52. These SE latches are used either to sign or zero extend the data latches when they are only providing a 16-bit quantity to the 24-bit bus. Similarly, the SE logic 52 is used to take either 7 or 8 bits of the current instruction and sign extend it to 24 bits for use by the branch and value instructions which get their displacement and their operand, respectively, from the right-hand portion of the instruction word.

There is also associated with the BRAM 12 and DRAM 11 logic called the select/modify logic 53, which allows the DRAM and the BRAM to be addressed in blocks of 8 registers using various fields in the instruction to control the individual register selection within that block.

Constants generator (KON) 70 is also included in element 16, the primary ALU area, and is another source to the I bus 14; that is, it is the source that can be used to generate 24-bit constants onto the I bus for use by the arithmetic logic unit under control of the firmware.

Thus, element 16 is the primary arithmetic operation area in the CPU; that is, it is concerned with operand manipulation and with the generation of operands for insertion into the DRAM 11, or operands which are intended to be sent to the O bus 17, either to be returned to the BRAM 12 or to be sent to various address and data registers for output to the local bus 9.

Element 22 is concerned primarily with the section of the CPU referred to as the Outer (O) bus 17 and the Write (W) bus 84. The O bus 17 is the bus upon which various data paths are collected, i.e., the Y register 24, the P register 23, the output of the DALU 15 and the RAM bus 13. The W bus 84 is the bus which is used to transfer operands to the BRAM 12, to the write data registers, and to the BALU 55 which is the ALU primarily responsible for address manipulation.

Between the O bus 17 and the W bus 84 is a set of 24 multiplexing shifters 19 which allow the shifts of 1, 2 or 4 bits in either direction on O bus 17 operands. In addition, there is also a set of 16 multiplexing shifters 56 which are used to load operands into the Q register 50.

Two of the four different types of operands which are sourced to the O bus 17 originate at the DALU 15 and at the RAM bus 13 and are selected through a two-to-one multiplexer 20 coupled to the O bus 17. Two other sources for the O bus 17 are the Y register 24 which is the data address register, and the procedure address (P) register 23. The outputs of these two units are coupled via the two-to-one multiplexer (Y/P selector) 21 and sourced onto the O bus 17. Also coupled to the O bus 17 is the I register 57, the indicator register for the central processing subsystem. The contents of the O bus 17 can be transferred either directly or shifted to the W bus 84 for further processing in the CPU. They can also be loaded into the Q register 50 directly so that the Q register can be used for double precision shift operations.

All shifting which takes place within the CPU takes place by manipulation of operands between the O bus 17 and the W bus 84. The twenty-four shifters 19 are used to shift 24-bit operands, the size of the operands on the O bus 17 and the W bus 84, left or right under the control of the control store word. They can shift by either 1, 2 or 4-bit positions, transfer the operand straight through, or transfer the operand through with the two right-hand bytes of the operand interchanged. The operation of these shifters is controlled by a special field in the control store word. This section of the CPU is used for 24-bit operand shifts. When 32-bit (double register) operands are shifted, the right-hand operand is loaded into the Q register 50 via the O bus 17, and then a shift is performed in which not only the W bus shifter 19, but also the sixteen Q register shifters 56 are operated. The Q register contents are thereby treated as a 16-bit extension on the right-hand end of the 24-bit operand which is being shifted onto the W bus 84; the ends of these two shifters are coupled together, thus allowing a 40-bit shift to occur. In such double register shifts, the operands of interest are the 16 bits which are returned to the Q register 50 and the 16 bits which are transferred to the right-hand two bytes of the O bus 17 while the left-hand 8 bits of the data of the W bus 84 are usually discarded.

Element 75 represents the collection of the status bits in the CPU for emission to the W bus 84 via driver 93 under certain conditions. The W bus 84 has two sources, the primary one being the shifter 19 from the O bus 17. This shifter 19 can be disabled as an input to bus 88 and instead the status bits (S/Z) in element 75 can be placed on the W bus 84 for subsequent analysis by the firmware.

One unit of hardware which is associated with the Q register 50 which has not been previously discussed is the XB register 58 and the decoder 59 coupled thereto. The XB register 58 is used during index shifting to capture those bits of the index which are shifted right for sub-word operands and which are lost because they move to the right of the single word bit in the address. They are captured in the XB register 58, one bit for half-word bits, two bits for digit shifts, and four bits for bit-sized operand shifts. The XB register 58 contents are subsequently used to directly control left versus right-half selection when dealing with half-word operands, when generating a parameter to be sent to the commercial instruction processor for digit operands, and to generate a mask of 15 binary ZERO's and a single binary ONE, in conjunction with the decoder 59, when operating on bit operands. That is, for a bit operand, a word is read, a mask is used to set or clear the selected bit in the word, and then the word is written back into the memory. The mask is generated from decoder 59 and is an input to the Q register 50. That is, one of the items that can be loaded into the Q register is the decoder mask generated from the contents of the XB register 58.

The fourth major element in the CPU is area 27, the element which is concerned with the generation of addresses, commands and operands for transmittal to the local bus 9, and via the local bus to either the CIP 102, the SIP 101, or the Cache/MMU 103 and hence, to memory or to Input/Output (I/O) devices 108. This major element can be broken down into approximately three areas, the first being the write data register (W) 28 and the write selector (WS) 29. Register 28 is a 32-bit register with a partitioned load capability, that is, either the right half or the left half, or both halves of this register can be loaded. The right half is always loaded from 16 bits of the W bus 84 via drivers 74. The left half is written with data which comes from the write selector 29. This write selector has as its 16 inputs either the 16 bits of the right half of the W bus 84 or the 8 left-hand bits of the W bus plus either sign or zero extension. The W bus is the primary path by which data can be sent to the W register 28 in order to subsequently write such data to any other device coupled on the local bus 9.

The next area in the local bus output interface 27 is the command driver 71. The command driver 71 drives a series of command lines which accompany all transfers by the CPU 100 on the local bus and indicates to the Cache/MMU 103 either a memory reference cycle, an I/O reference cycle, or a local bus reference cycle to the Cache/MMU or one of the local bus processing units. The information which is transferred onto the command lines is derived from the F and FK fields of the control store or firmware (FW) word shown in FIG. 4, which also at other times the functioning of the F register 38 of element 10.

The third portion of element 27 includes the two primary address registers, i.e., the Y register 24 for non-procedural memory addresses and for addresses to other devices on the local and system buses, and the P register 23 (the program counter), and the prefetch register 26.

The P counter 23 keeps track of the last word which the firmware has used, which word has been taken from the round robin buffer 36 and input to the CPU 100 for operations thereon. The prefetch register 26 keeps track of which word is to be next fetched from memory; that is, the P and PF registers may differ by any number in memory address from one to four words, depending on how full the round robin buffer is and how recently the central processing system has taken data from the buffer. If the central processing system has taken all the data from the buffer, it takes a finite amount of time for the Cache/MMU 103 to respond with new data in response to a request, and fill buffer 36 again. Under those circumstances, the prefetch register 26 and the address of the P counter or register 23 would be close together or the same in address content. When the buffer 36 is full and the CPU 100 has not taken any data recently, then the P register will be two to four words behind the prefetch register because it is indicating the last word taken from the prefetch register which indicates the next word to be sent forth from memory as soon as there is room for it in the prefetch register.

The contents of the P register 23 are never admitted to the local bus 9 as a memory address source. The two sources for data which can go to the local bus via the virtual address multiplexer 25 are the Y register 24 which is used for all non-procedural fetches and the prefetch register 26 which is used automatically by the prefetch logic to go to memory and request words for use in subsequent firmware steps.

The arrows on devices 23, 24 and 26 are indicative of the incrementing capability of those particular registers. That is, the P register can increment by either one or two words depending on the number of words which are taken out of the prefetch buffer 36 at a time. That is, pulling one word from the prefetch 36 buffer automatically increments the P register by one; pulling two words from the prefetch buffer 36 automatically increments the P register by two. The prefetch register 26 always increments by two because prefetches are always performed on a pair of words. The Y register can increment by either one or two under the control of the firmware as it is used, or in preparation for future use. There is a bus control field in the firmware word which allows control of such incrementing and the various cycle requests to the local bus.

The inputs to the W register 28 are two 16-bit data paths which are exercised in various ways. If it is desired to write a 24-bit address, then the drivers 74 are turned on enabling the right-hand 16 bits of the W bus to be transferred to the right-hand 16 bits of the W register. The multiplexer 29 is conditioned such that the left-hand 8 bits of the W bus and the 8 binary ZERO's are emitted to the left-hand half of the W register 28. This loads a two-word, 24-bit address into the W register for subsequently writing into memory. If it is desired to write a single word into memory, then the right half of the W register is not clocked (i.e., enabled) and does not change; the multiplexer 29 is conditioned to enable the 16 right-hand bits of the W bus to the 16 left-hand bits of the W register where they are clocked in. For single word writes the left half of the W register is the data that is written into memory.

The logic heretofore described is used to request and accept data from other entities on the local bus 9 such as the Cache/MMU 107, the CIP 102 or the SIP 101, to operate on it and store it internally in various registers via the two ALU's which are contained in the system, and to create new operands which are subsequently modified and sent out to the local bus to one of the entities thereon with an address of which entity (computed internally in the CPU and used to control the local bus). All of these operations are performed under the control of control firmware which is stored in a 2,048-word by 96 bits-per-word control store 80 and 81 which is included in the CPU.

Figure 4:
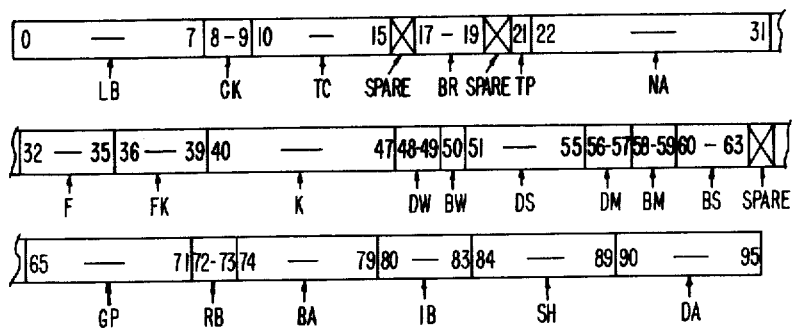
FIG. 4 illustrates details of the composition of locations of the control store included in the central processing unit of the present invention.

The control store is partitioned into a number of individual fields, each of which controls some aspect of the internal performance of the CPU. FIG. 4 illustrates the firmware word and the various fields of interest therein. The first of these fields is the local bus (LB) field, bits O through 7 of the control store. The LB field is concerned with the requesting of various cycles from the local bus 9 and the responses thereto. It is also responsible for the emission of virtual addresses via the prefetch register 26 or the Y register 24, and it controls the various incrementing of the Y and P registers. The local bus field also controls the successive reading of data from the round robin procedure buffer 36 and the enabling of the data and procedure multiplexers 34, 35, 39 and 40, respectively, onto the source bus 33 for subsequent use by the I bus 14.

The next field, the clock (CK) field, bits 8 and 9 of the control store, is used to control the CPU clock speed, i.e., the interval between successive clock pulses in the CPU. Each firmware step has assigned to it the clock speed which is appropriate to its complexity. In the system of the present invention, there are four possible intervals between successive clock pulses: 96 nanoseconds, 105 nanoseconds, 130 nanoseconds or 170 nanoseconds. Which of these is used for a firmware step is controlled by the CK field for that firmware step.

The next field is the TC field, bits 10 through 15 in the control store. This is a 6-bit field and selects one of 64 possible logic functions within the CPU for testing and control of firmware sequences.

The next field is the BR field, bits 17 through 19, and is used to control the type of action which is taken as a result of a test condition; that is, what type of branch occurred, whether the branch simply selects between two firmware steps or whether it selects between a firmware step and a so-called control store splatter (the generation of one of a multiplicity of control store next addresses based on the state of one or more logic elements in the CPU in which the next address is controlled by some function of the F register 38 contents).

The next field of interest, the TP field, bit 21, is the Test Polarity field. It controls whether the test condition is tested to determine whether it is true or false.

The NA field, bits 22 through 31, is a 10-bit field which is used to generate at least one of the two addresses which are selected by all branches. The other address is either derived also from the same NA field or from the control store splatters previously mentioned.

The next field, bits 32 through 39, is the F register control field, partitioned into a 4-bit part called F and a second 4-bit part called FK. The F and FK fields are used to control the loading and strobing of various elements in the F register and in the area of the F bus; that is, it is used to control the strobing of F' and AS' devices, the subparts of the F register 38 and the multiplexer 43. Which of these devices is loaded and what sources they have for their loading are all controlled by the F and FK fields.

The next field, bits 40 through 47, is the K (i.e., constant) field and is used to drive the I bus 14. It is an 8-bit field which provides the right-hand 8 bits for all constants which are admitted to the I bus. The left-hand 16 bits of the constant are controlled by the I bus field which will be discussed herinafter. The K field is directly related to the KON device 70.

The next fields in the control store, bits 48 through 63, are concerned primarily with the addressing and control of the DRAM 11 and the BRAM 12. The 2-bit field, DW, is used to control writing into the DRAM with 1 bit controlling write operations into the leftmost (the most significant) 8 bits of the DRAM, and the other bit controlling write operations into the second rightmost (the least significant) 16 bits. The next bit, bit 50 (field BW), is used to control write operations into both parts of the BRAM, which are always written into together. The next field, DS, is 5 bits in length and provides the selection of 1 of 32 registers in the DRAM 11. The DM field, bits 56 and 57, is the select/modify field associated with the DRAM and allows the selection of either the DRAM directly or any of three different functions of the F register 38 for qualifying the addressing of the DRAM.

The next field of interest is the B select field (BS), bits 60 through 63, which is used for the selection of 1 of the 16 registers in the BRAM. The 2-bit field comprising bits 58 and 59 is the select/modify field (BM) for BRAM addressing. It performs similarly to that for the BRAM addressing except that it is separate so that independent select and modify functions can be specified for both the BRAM and DRAM.

The next field of interest is the GP field which is 7 bits in length (bits 65 through 71) and is used to control a large number of general purpose microoperations within the processor such as the clocking of various bistable flip-flops and the enabling of various control functions. It is also used to control access to the control panel 90 from the CPU, to input and output data to the control panel, and to control various flip-flops therein.

The next field, the RB field, bits 72 and 73, is used to control the sourcing of data onto the R bus 13 with 1 bit controlling the BRAM and the other bit controlling the DRAM.

The BA field, bits 74 through 79, is used to control the functions of the BALU 55, the arithmetic logic unit which has as its inputs the I bus and the W bus and which can be used to drive the Y register 24. These 6 bits are used as follows: one as a carry inject to the BALU, one for logic/arithmetic control, and the other four to select particular functions.

The next field of interest is the IB field, bits 80 through 83, and is used to control which data source is enabled to the I bus 14. This field can enable the data latches, sign extend the F register or select a constant, or the BRAM, in various combinations to the I bus.

The next field, the SH field, bits 84 through 89, is used to control both the shifters and the W bus sourcing which was discussed earlier. The 6 bits enable the system to have a large amount of autonomous control over what registers are enabled to the W bus and whether or not the Q register loads and in what direction the shifters shift the operand as it passes through.

The final field, the DA field, bits 90 through 95, is the function control for the DALU 15 with 6 bits having analogous functions to those in the BA field, i.e., one bit is a carry inject, one bit selects logic versus arithmetic and the other four bits are to select particular functions.

The control store for the CPU is actually two control stores: an upper bank 80 and a lower bank 81. The upper bank is addressed by the next address generator 44 and the lower bank is addressed directly by a portion of the contents of the then-current control store word. In the case of the more common types of branches, both use the NA field of the control store word as the basic source of the next address, and modify it in some way so that the two addresses which go to the upper and lower banks are essentially identical. In the case of the other branches, those which select between a next address and a PROM generator splatter, the lower bank receives the next address field unchanged from the current control store word, while the upper bank receives the splatter address from the current control store word. The control store is partitioned in this way so that the system can be doing a simultaneous access of both possible next address control store words and can postpone the decision of which one is going to be used until almost the very end of the current control store step, just prior to clocking the data in the control register 82. The details of the control store shall be discussed hereinafter.

The manner in which the CPU and firmware interact to perform certain typical central processor operations such as (a) reading a word from memory, (b) computing a next address for reading another word from memory, (c) writing a word into memory and (d) performing some type of iterative algorithm in which the operations are entirely internal to the CPU will now be discussed. The situations given will be typical and representative operations will be described.

In the case of reading a word from memory during a control store step, the control store word will enable the virtual memory address of the word from the BRAM 12 onto the RAM bus 13 via the RB, BS and BM fields. The SH field will then condition the O bus and the W bus sourcing such that the RAM bus is enabled through the selector 20 to the O bus 17, and then unaltered through the shifter 19 onto the W bus 84. The W bus is an input to the BALU 55, which is conditioned by the BA field to enable its W bus input directly to its output. At the same time, the LB field will cause the Y register 24 to load, thus transferring the address into the Y register.

In the next firmware step, the LB field then causes a request to be directed to the local bus indicating that a memory request is required and that the address provided to the local bus should be used to make such a request. The command lines 71 are conditioned by the F and FK fields (shown as box 72 in FIG. 2) to indicate the memory read request is required. The address multiplexer 25 is conditioned to enable the contents of the Y register onto the local bus via the 24 address lines. The Cache/MMU memory which monitors and controls all activity on the local bus acknowledges the request, while the CPU proceeds to the next firmware step. In the next firmware step, the local bus field will then specify a stall, indicating that the CPU should not leave this firmware step until the end of the local bus cycle has been detected returning the data from the Cache/MMU via the local bus into the CPU data buffer. As soon as this return cycle is detected, the stall ends and the CPU will enter the fourth step of this read cycle.

The fourth step will be one in which the firmware will specify an LB field which uses the data that is in the data buffer and sources it onto the I bus for use by the CPU. The LB field will thus enable either the DA driver 34 or the DW driver 35, depending on whether a word, 16 bits in length, or an address, 24 bits in length, is required onto the source bus. In turn, the I bus field will specify that the source bus, either all 24 bits of it or 16 bits sign extended to 24, will be enabled onto the I bus. In the I bus, assuming that there is a 16-bit word that is being received back from the data buffer, the DA field would be used to enable the DALU to read the I bus and the DW, D select and DM fields would be controlled to address the write into one of the 32 registers in the DRAM. This would complete the fourth step of this control sequence, the first of which loaded the Y register, the second of which made the read request, the third of which waited for data to come back, and the fourth of which took the data and enabled it into one of the registers in the CPU.

A second typical sequence of operations which may be performed by the system is the manipulation of operands in an arithmetic operation such as adding an operand which has been fetched from memory to one of the data registers and, after the addition, returning to the data register and placing it into the write data buffer so that it can be subsequently written back into memory. This sequence of operations would begin following the stall referred to in the previous operation. This step would be one which enabled the data, which in the case of a word operand would be a word, from the data buffer 31 via the L bus and the data multiplexer 35 onto the source bus. Then, the I bus field would specify that the source bus, sign extended via the sign extension device 52, and the data latches 51 be enabled onto the I bus. At the same time, the R bus control field would specify that the particular data register of interest be enabled to the R bus 13 from the DRAM 11. The DA field, i.e., the DALU control field, would then specify that the DALU be conditioned to add the 24 bits on the R bus 13 to the 24 bits on the I bus 14. This logic 15 would have as its output 24 bits representing the sum. The DW bit would indicate that the output of the DALU was to be written back into the DRAM 11.

At the same time, the output of the DALU would be enabled to the W bus via the SH field. This field would indicate that the selector 20 would be enabled to the O bus and would be conditioned to select the DALU output instead of the R bus output for that purpose. Also at the same time, the shifter 19-1 would be conditioned to pass the O bus contents through without change to the W bus 84. The same LB field which specified DW 35 to the source bus 33 would also have specified that the W bus would be enabled to the left half of the W register 28 via the selector 29. This would all take place in a single firmware step. Since this is an add operation, presumably the overflow from the add would be tested by a test specified by the test logic 30. The next address logic would generate one address which would indicate a particular entry to go to if the operand is to be written back into memory immediately. The other address, which would be to the lower bank, would be generated to take the next step which would then set the overflow indicator in the I register 57. If there was no overflow, the I register would have been automatically cleared.

The third operation would consist of writing an operand into memory. This would take three firmware steps to perform. The first would be a step in which the address in which the operand is to be written is loaded into the Y register 24. The second step would be to put the operand to be written into the W register 28. The third step would be one in which the LB field would specify that a local bus request, specifying a memory write, be addressed to the local bus for the Cache/MMU to receive and execute.

The first step, that which loads the Y register 24, would get the address presumably from one of the 16 locations in the BRAM random access store. This would be performed by conditioning the I bus field so that the I bus would look at the output of the BRAM. The B select field would indicate which of the 16 BRAM registers was addressed for this purpose. The BALU 55, which is controlled by the BA field, would be conditioned to pass the contents (24 bits) of the I bus to its output. The LB field would be one which specified to load the Y register. Since input to the Y register is the output of the BALU, this would transfer the contents of the selected BRAM into the Y register. The next control store step would take the operand from its origin, wherever that might be, in this case, for example, one of the 32 DRAM locations. The DS field would select which of the 32 DRAM's would be enabled. The RB field would enable the DRAM onto the R bus. The SH field would select the RAM bus to the O bus 17 via selector 20, and the O bus to the W bus 84 via shifter 19 with no shifting taking place. The LB field would specify to load the W register, left half. This would be performed by conditioning the W selector 29 to enable the right two-thirds of the W bus to the left half of the W register, and the W register would be enabled to load its left half.

Finally, the third firmware step would be performed. In this firmware step, the only essential operation is that the local bus field, the LB field, should specify a local bus write to memory. This would use the F and FK bits as command lines going to the local bus to indicate to the Cache/MMU that this is a memory write operation. The address would be enabled to the local bus via the virtual address selector 25 from the Y register 24. The data would be enabled to the local bus from the W register 28. The Cache/MMU memory arbitrating all local bus transfers would recognize this as a memory write cycle and would take the address, map it, send it to memory accompanied by the data, and indicate on the system to the memory that this is a memory write operation.

The fourth sequence of a typical operation which the CPU could perform is that in which a double precision operand is shifted some number of bits to the left or right. Presuming that the operands are both in the BRAM, that is, the two operands of interest are in the BRAM, the first firmware step would initiate the transfer of the right-hand of these two operands to the Q register. This would proceed as follows. The BS field would be conditioned to address one of the 16 locations that contains this operand in the BRAM 12. The R bus field, controlling the RAM bus 13, would be conditioned to take the BRAM output instead of the DRAM output. The SH field would be conditioned to transfer the R bus to the O bus via the selector 20, by enabling it to the O bus and selecting its input from the R bus, and would also specify that the Q register and the W bus both receive the contents of the O bus and would clock the Q register to load it. This would cause the operand addressed in the BRAM to be transferred to the Q register.

The next step, or steps, would be those in which the shifts are actually performed. In this step, the other of the two registers containing the second operand in the BRAM is addressed by the B select field and the BRAM is enabled onto the RAM bus 13 via the RB field. The RAM bus would then be enabled to the O bus via the selector 20. The SH field would take any of a number of values depending on which direction and for how many bits the shift is to be performed. The SH field is capable of selecting a left or right shift of either 1, 2 or 4 bits. In any of these cases, the Q register 50 is considered to be connected as an extension of the O bus 17, creating a 32-bit operand. Actually, it is a 40-bit operand but the left-hand 8 bits of the O bus are ignored. This 32-bit operand is shifted either left or right as indicated by the particular SH field. The 16 right-hand bits are returned to the Q register 50 and the 16 left-hand bits, together with the 8 bits which were ignored, are transferred onto the W bus 84. This is controlled by the SH field which has exclusive control over the shift distance.

The operand having been shifted from the O bus 17 to the W bus 84 and from the Q register back to the Q register, the SH field causes the Q register to reload the shifted operand, while at the same time the BW field causes the W bus to be written into the addressed BRAM location. Thus, the contents of the B and Q registers have been shifted and returned back to the B and Q registers. The particular end effects associated with this shift, whether this is an open, circular or arithmetic shift, are a function of the control flip-flops in the CPU. This type of step in which the actual shifting is performed is perfomed some number of times in various combinations. That is, if it were desired to shift left by 5 bits, then a step which resulted in a shift left by 1 bit would be succeeded by a step which shifted left by 4 bits. To shift right by three would require a shift right by two and then by one, for example.

After the final shift has been performed, i.e., after the operands are now correctly aligned in the addressed BRAM location and the Q register, the final step does not cause a shift but instead returns the Q register contents back to the BRAM location from which it was originally loaded. This would be performed as follows. The I bus field would specify that the I bus is driven by the Q register (16 bits of Q extended by 8 bits of binary ZERO's). The DALU 15 would be controlled by the DA field so that it passed through the I bus unchanged. The SH field would be selected so that it enabled the DALU, unchanged via the selector 20, to the O bus 17, and again unchanged, via the shifter 19 to the W bus 84. The BW bit 50 in the firmware word would then be set to condition the loading of the BRAM from the W bus and the BS (B select) bits would be conditioned to specify which of the 6 locations in the BRAM were to receive the shifted operand. This would all take place in some number of firmware steps, for example, three or more. One step would be used to load the Q register creating a 40-bit operand, one or more to perform the shifting of that operand as required, and then one to return the Q register contents (the right-hand 16 bits) to the BRAM to complete the operation.

The CPU 100 is a microprogrammed 24-bit processor which receives instructions and 16-bit or 24-bit operands from the cache/MMU 103 and executes the instructions by manipulating the operands. This specification describes the apparatus which under microprogram control realigns the operands and memory addresses as they are transferred from the various sources via the R bus 13 and the O bus 17 to the W bus 84. The apparatus for the alignment of the operands and memory addresses is responsive to the SH shift field bits 84 through 89 of the 96-bit microword of FIG. 4.

Referring to FIG. 5, operands and addresses are transferred from various sources in the CPU 100 onto the W bus 84. The outputs of DRAM 11 and BRAM 12 of FIG. 2 are transferred over R bus 13 and applied to input terminals 1 of multiplexers (MUX's) 20-2 and 20-4 as 24 signals RBUS 08-31+. For better understanding the specification, a signal with a plus sign XXXXXX+ is at logical ONE when the signal is high. A signal with a minus sign XXXXXX− is at logical ONE when the signal is low. The output of DALU 15, signals DALU 08-31+, is applied from shift distance control logic 22-12 to input terminals 1 of MUX's 20-2 and 20-4. Signal CRSHF0+ indicates the state of bit 84 of the control store word of control store 80 and is applied to MUX's 20-2 and 20-4 to select either the R bus 13 or the DALU 15 signals. Signal SSTOOB− from shift end logic 22-12 enables MUX 20-2 and signal SSOBLF− enables MUX 20-4. The output of MUX's 20-2 and 20-4, signals OBSS 08-31−, is applied to O bus 17 through wired-OR terminals 17-2. Signal SSOBLF— disables MUX 20-4 during a 24-bit or 32-bit arithmetic shift operation when the QREG 28-31— signals are placed on the O bus 17 via a MUX 20-6 as signals OBQR 12-15—. Binary ONE bits which force signals OBUS 12— through OBUS 15— to logical ZERO are applied to terminal 1, signal FSHIN1+ selects terminals 0 or 1 and signal OBQREN— enables MUX 20-6. This shift end operation is described infra.

The P register 23 signals PCTR 08-31+ and the Y register 24 signals YCTR 08-31+ are applied to terminals 0 and 1, respectively, of the MUX's 21. The output of MUX's 21, signals OBYP 08-31—, is applied to O bus 17 via wired-OR's terminals 17-2. Control store 80 shift bit 84 signal CRSHF0+ selects either terminal 0 or terminal 1 of MUX's 21 which is enabled by signal YPTOOB— from shift end logic 22-8.

The flag signals applied to drivers 20-8 and 20-10 from I register 57 appear as O bus 17 signals OBUS 24-31—. The I register 57 is loaded and these signals are tested by the software to initiate software branches. Drivers 20-8 and 20-10 are enabled by signal RITOOB— from shift end logic 22-8.

Signal RIOVFF+ appearing as signal OVFF 24— is an overflow flag. Signal RICRYF+ appearing as signal OCYF 26— is a carry flag. Signal RIBITF+ appearing as signal OBTF 27— is a bit operation flag indicating the result of a bit test. Signal RIACKF+ appearing as signal OAKF 28— is an input/output acknowledge flag. Signal RIGTRF+ appearing as signal OCTF 29— is a "greater than" flag. Signal RILESF+ appearing as signal OLSF 30— is a "less than" flag. Signal RISNEF+ appearing as signal OSNF 31— is an unequal sign flag. Signal ZGND 25— is at logical ZERO.

The O bus 17 transfers 24 address bits to the shifter 19 when the MUX's 21 selects the addresses stored in either the P register 23 or the Y register 24. The O bus 17 transfers words containing 24 bits or words containing 16 bits to the shifter 19 when MUX's 20-2 and 20-4 select the data from the DALU 15 or from R bus 13. The data word received by the shifter 19 contains 24 data bits, signals OBUS 08-31—.

Signals CDBSD1+, CDBSD2+ and CDMSD0+ are applied to shifter 19 from shift distance control logic 22-12 to shift signals OBUS 08-23— either 0, 1, 2 or 4-bit positions left or right. Signals CDBSD1+, CDBSD2+ and CDRSD0+ are applied to shifter 19 to shift signals OBUS 24-31— either 0, 1, 2 or 4-bit positions left or right. The shifter 19 output signals WBSH 08-31+ are applied to W bus 84 via wired-OR's 84-1 as signals WBUS 08-31+.

Signals QREG 16-31— from Q register 50 are applied to Q shifter MUX's 56. Signals CDQSD0+, CDQSD1+ and CDQSD2+ are applied to the Q shifter MUX's 56 from shift distance control logic 22-12 to shift signals QREG 16-31— either 0, 1, 2 or 4-bit positions left or right.

The output signals of the Q shifter MUX's 56 are stored in the Q register 50. The Q register 50 output signals QREG 16-31— are transferred onto the I bus 14 via drivers 54.

The OBUS 16-31— signals are applied to the Q shifter MUX's 56 for storage in Q register 50, typically during the execution of a double precision arithmetic instruction. Then on a subsequent control store 80 cycle a 32-bit operand may be shifted through the shifter MUX's 19 and the Q shifter MUX's 56. During a left shift, the shift end logic 22-8 shifts signals QREG 16-17— from Q register 50 to shifter MUX's 19 by generating signals OBUS 32-33—. Signals QREG 18-19— are applied directly to shifter MUX's 19 for the left shift. For the circular left shift signals, the shift end logic 22-8 shifts signals OBUS 16-19— into the Q shifter MUX's 56 as signals QLSH 32-35—. For the right shift, one or more of signals OBUS 28— through OBUS 31— are selected by the Q shifter MUX's 56 when signals CDQSD 0-2+ from shifter distance control logic 22-12 indicate a 1, 2 or 4-bit right shift.

The XB register 58 receives the QMUX 16-19— signals from Q shifter MUX's 56. During address formation, for example, an address word stored in the BRAM 12 of FIG. 2 is added to an index word stored in the DRAM 11 and the sum is stored in the Y register 24. Depending on the operand size, the index value is shifted for alignment with the address word. If shifted right, the index residue shifted off the right end of the address word is stored in the XB register 58. The 4 output signals XBREG 0— through XBREG 3— are subsequently decoded in decoder 59 and stored in the Q register 50 via signals HEXD 16— through HEXD 31— and the Q shifter MUX's 56. The XB register 58 is enabled by a control signal XBCLOK+ from the GP field, FIG. 4, of control store 80.

Signal SZTOWB+ is generated from shift end logic 22-8 by control store 80 bits SH 86, 87 and 89 to enable shifter MUX's 19.

Figure 6:
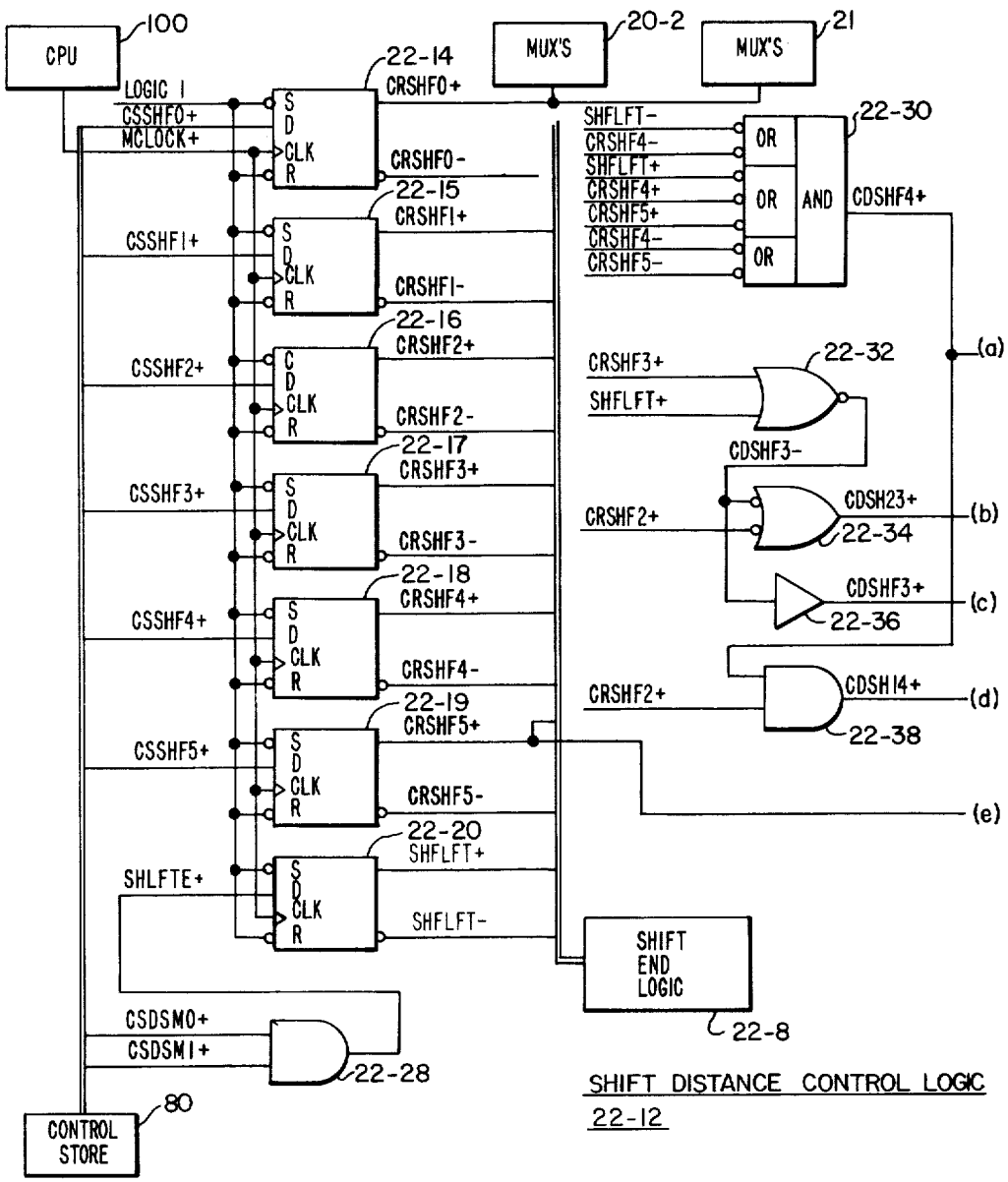
FIG. 6 is a logic diagram of the shift distance control logic 22-12.
Figure 6:
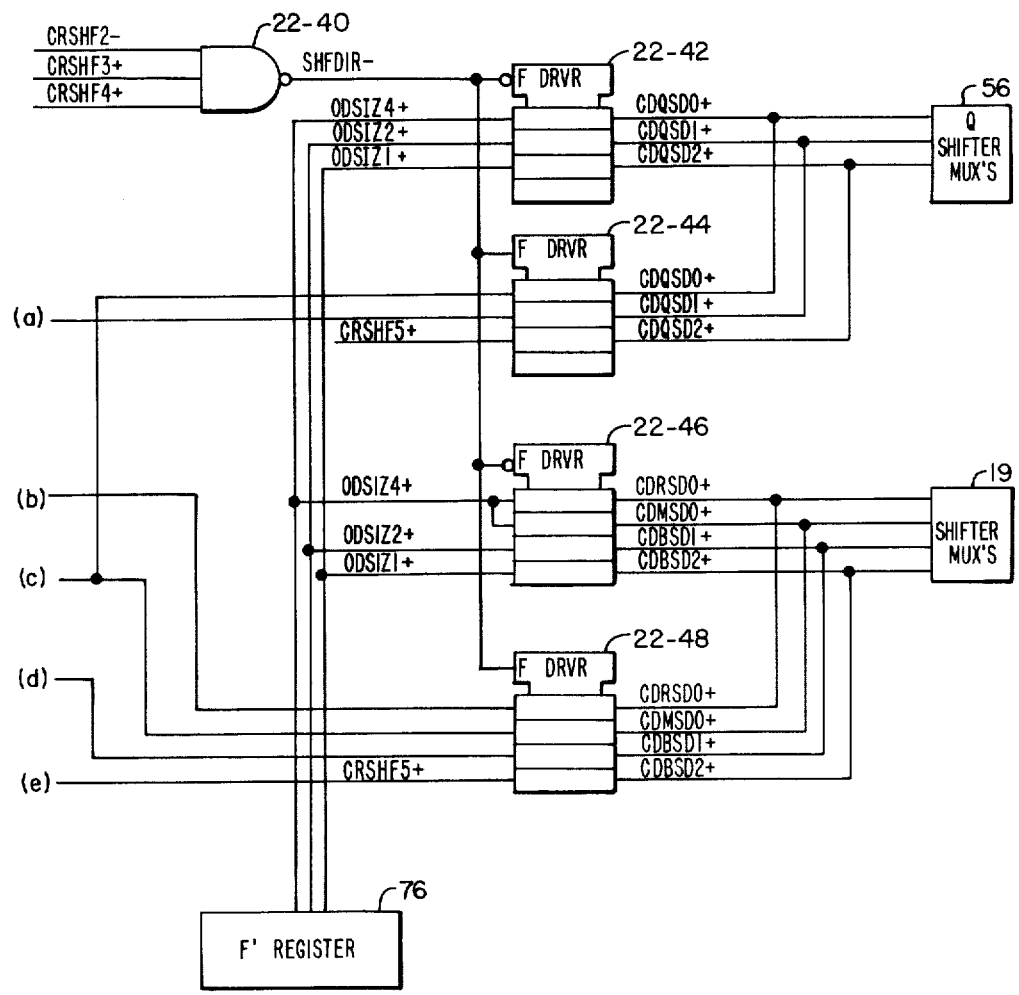

Referring to FIG. 6, the shift distance control logic 22-12 receives 6 signals CSSHF0+ through CSSHF5+ from control store 80, which indicate the state of the shift bits 84 through 89, FIG. 4, respectively. The signals CSSHF0+ through CSSHF5+ condition the setting of 6 flops 22-14 through 22-19 respectively on the rise of clock signal MCLOCK+ from CPU 100.

A shift left flop 22-20 is set to indicate a shift left operation on the rise of the clock signal MCLOCK— when signals CSDSM0+ and CSDM1+ at logical ONE are applied to an AND gate 22-28. This forces the shift left enable signal SHLFTE+ to logical ONE setting the shift left flop 22-20. The shift left flop is reset on the rise of the clock signal MCLOCK+ when either signal CSDSM0+ or CSDSM1+ is at logical ZERO, or both signals are at logical ZERO indicating a right shift.

The shifter MUX's 19 of FIG. 5 is divided into 3 sections, the L section including the 8-bit positions 8 through 15, the M section including the 8-bit positions 16 through 23 and the R section including the 8-bit positions 24 through 31. Signals CDBSD1+, CDBSD2+ and CDMSD0+ control the shifting in the L and M sections of shifter MUX's 19 and signals CDBSD1+, CDBSD2+ and CDRSD0+ control the shifting in the R section of shifter MUX's 19. These signals are applied to the shifter MUX's 19 by a driver 22-46 or by a driver 22-48. Driver 22-48 is selected by a NAND gate 22-40 output signal SHFDIR— at logical ONE when the shifting is controlled from the firmware word. That is, if one or more of the signals CRSHF2— at logical ONE, CRSHF3+ at logical ZERO or CRSHF4+ at logical ZERO, the output signals from flops 22-16, 22-17 and 22-18, respectively.

Signal CDBSD2+ is generated by signal CRSHF5+ applied to driver 22-48 when flop 22-19 is set.

Signal CDBSD1+ is generated when signals CRSHF2+ and CDSHF4+ applied to an AND gate 22-38 are at logical ONE. Signal CDSHF4+, the output of a NOR/AND gate 22-30, is at logical ONE in response to the Boolean expression:

$$CDSHF4+ = (\overline{SHFLFT-} + \overline{CRSHF4-})(\overline{SHFLFT} + +\overline{CRSHF4+} + \overline{CRSHF5+})(\overline{CRSHF4-} + \overline{CRSHF5-})$$

Signal CDMSD0+ at logical ONE is generated as follows. Signal CRSHF3+ or SHFLFT+ applied to a NOR gate 22-32 at logical ONE forces signal CDSHF3− to logical ZERO. An inverter 22-36 generates signal CDSHF3+ at logical ONE to generate signal CDMSD0+ at logical ONE.

Signal CDRSD0+ at logical ONE is generated as follows. Signal CDSHF3− or CRSHF2+ at logical ZERO applied to a NOR gate 22-34 generates signal CDSH23+ at logical ONE. This forces signal CDRSD0+, an output of driver 22-48, to logical ONE.

Drivers 22-42 and 22-44 generate the Q shifter MUX's 56 control signals CDQSD0+, CDQSD1+ and CDQSD2+. Driver 22-44 is enabled by signal SHFDIR− at logical ONE. Signal CDSHF3+ at logical ONE forces signal CDQSD0+ to logical ONE. Signal CDSHF4+ at logical ONE forces signal CDQSD1+ to logical ONE. Signal CRSHF5+ at logical ONE forces signal CDQSD2+ to logical ONE.

The signals ODSIZ1+, ODSIZ2+ and ODSIZ4+ from a programmable read only memory (not shown) addressed by signals from the F′ register 76 are applied to drivers 22-42 and 22-46 which are enabled by signal SHFDIR− at logical ZERO. These signals generate the control signals CDQSD2+, CDQSD1+ and CDQSD0+, respectively, from driver 22-44 which are applied to the Q shifter MUX's 56 and signals CDBSD2+, CDBSD1+, CMSD0+ and CDRSD0+, respectively, which are applied from driver 22-46 to shifter MUX's 19. The signals ODSIZ1+, ODSIZ2+ and ODSIZ4+ indicate a binary number which is representative of the type of operand being processed by the CPU 100. An instruction processing a bit operand results in a binary code of 001, that is, signal ODSIZ1+ is at logical ONE and signals ODSIZ2+ and ODSIZ4+ are at logical ZERO. An instruction processing a digit operand (4 bits) results in a binary code of 010. For a half word operand (8 bits), the binary code is 011; for a full word operand (16 bits), the binary code is 100; for a double word operand (32 bits), the binary code is 101; and for a quad word operand (64 bits), the binary code is 110. The use of these signals ODSIZ1+ through ODSIZ4+ is described infra. Note that signal CRSHF0+ is applied to the selection terminals of MUX's 20-2 and MUX's 21. The generation and function of signals ODSIZ1+, ODSIZ2+ and ODSIZ4+ are described in copending related application Ser. No. 326,442 entitled "Microprogrammed Control of Entended Integer Instructions Through Use of a Data Type Field in a Descriptor Word in a Central Processor Unit".

Referring to FIG. 7, the shift end logic 22-8 controls the replacement of data bits or address bits at the left end of the operand or address word as they are shifted right and the replacement of bits at the right end of the operand or address word as they are shifted left as a function of the shift end logic 22-8 control signals FSHIN1+ and FSHIN2+. The shift end logic 22-8 also controls the shifting of data or address bits between the shifter MUX's 19 and the Q shifter MUX's 56.

There are 4 types of shifts controlled by the shift end logic 22-8: 24-bit arithmetic, 32-bit arithmetic, 32-bit circular and 32-bit open. The 24-bit arithmetic shift takes place between the O bus 17 and the W bus 84. The 24 bits represented by signals OBUS 08-31− are shifted and appear as 24 bits represented by signals WBUS 08-31+.

Assume a right arithmetic shift. The leftmost bit OBUS 08− is presumed to be a sign bit, binary ZERO for a plus sign and binary ONE for a minus sign. As the operand or address word is shifted to the right, the sign bit is repeated in each bit position into which the sign bit is shifted. For example, assume an operand 24 bits long having a negative sign having the left end of 1001 . . . A right shift of 2 bits results in an operand of 111001 . . . on the W bus 84. The rightmost 2 bits are lost. During a left arithmetic shift, the sign bit is lost and binary ZERO bits fill in the right end of the operand.

During a right circular shift, the bits that spill off the right end of the operand are used to replace the bits at the left end of the operand. During a left circular shift, the bits that spill off the left end of the operand are stored in the bit position vacated at the right end of the operand.

During 32-bit shift operations, 16 bits are stored in the Q register 50 and pass through the Q shifter MUX's 56 during the same cycle that the remaining 16 bits of the 32-bit operand pass through the M and R portions of shifter MUX's 19. During right shifts, the binary bits pass from the right end of the shifter MUX's 19 to the left end of the Q shifter MUX's 56. Similarly, on left shifts, binary bits pass from the left end of the Q shifter MUX's 56 to the right end of the shifter MUX's 19.

Signals FSHIN1+ and FSHIN2+ are generated by the control store 80 bits of the GP field, FIG. 4, inverted by inverters 22-82 and 22-80, respectively, and applied to the inputs of a decoder 22-84 as signals FSHIN1− and FSHIN2−. The decoder 22-84 output signals CDOPEN−, CDCIRC−,CDAR32− and CDAR24− are applied to the I register 57 to control the generation of the software visible flag signals applied to drivers 20-8 and 20-10 of FIG. 5. Signal FI-SHIN1− at logical ZERO and signal FSHIN2− at logical ONE select signal CDCIRC− indicating a left or right circular shift. Signal CDCIRC− at logical ONE conditions NAND gates 22-92, 22-94 and 22-96 to be responsive to the O bus 17 signals OBUS 17−, OBUS 18− and OBUS 19−, respectively. Also, signal FSHIN2− at logical ONE and signal FSHIN2+ at logical ONE condition a NOR/AND gate 22-76 to be responsive to signal OBUS 16− to generate signal QLSH32− via signal SHENDQ+ and a NAND gate 22-78. This results in a left circular shift from bit position 16 of shifter MUX's 19 to bit position 31 of Q shifter MUX's 56.

The left shift from bit position 16 of Q shifter MUX's 56 to bit position 31 of shifter MUX's 19 is conditioned by signal QRLDEN− applied to NAND gates 22-64 and 22-66 to generate signals OBUS 32− and OBUS 33− from signals QREG 16− and QREG 17− for the 1-bit and 2-bit left shift. For the 4-bit left shift, signals QREG 18− and QREG 19− are applied directly to bit positions 30 and 31, respectively, of shifter MUX's 19. Signals QREG 16− and QREG 17− are controlled by the NAND gates 22-64 and 22-66 to force binary ZERO's into bit positions 30 and 31 of shifter MUX's 19 during a 24-bit left shift with the Q register 50 not enabled since the firmware only calls for a 1-bit or 2-bit left shift and never a 4-bit left shift during the 24-bit left shift operation.

Signal QRLDEN— is generated from firmware signals CRSHF1—, CRSHF2— and CRSHF5—; via NOR/AND gate 22-60; signal QRLDEN+, and inverter 22-62. Signal QRLDEN+ and clock signal MCX000— from CPU 100 applied to a NAND gate 22-98 generates the loading signal QRLOAD— for loading the Q register 50 with the ouput of Q shifter MUX's 56.

For a right circular shift or a right open shift 32 bits in length, signals CRSHF1+ and FSHIN2+ at logical ONE are applied to a NAND gate 22-88 to generate signal OBQREN— which enables MUX 20-6. Signal FSHIN1+ at logical ZERO for the circular shift transfers signals QREG 28-31— to the O bus 17 via signals OBQR 12-15—, wired OR 17-2 and and OBUS 12-15—. If signal FSHIN1+ is at logical ONE for the right open shift, then signals OBUS 12-15— are forced to logical ZERO's.

During the right circular shift, therefore, the bits that shift out of bit position 31 of the Q shifter MUX's 56 will appear on the W bus 84 starting with signal WBUS 16+. For example, for a 2-bit right circular shift, the binary bits in positions 30 and 31 of Q shifter MUX's 56 will be transferred to bit positions 14 and 15 of shifter MUX's 19 and be shifted to signals WBUS 16+ and WBUS 17+.

During a 2-bit right open shift, 2 binary ZERO's will shift through shifter MUX's 19 to force signals WBUS 16+ and WBUS 17+ to binary ZERO.

MUX's 20-2 are enabled by signal SSTOOB— from a NOR gate 22-68 and MUX's 21 are enabled by signal YPTOOB— from a NAND gate 22-70. A NAND gate 22-72 generates signal RITOOB— to enable drivers 20-8 and 20-10.

Figure 8:
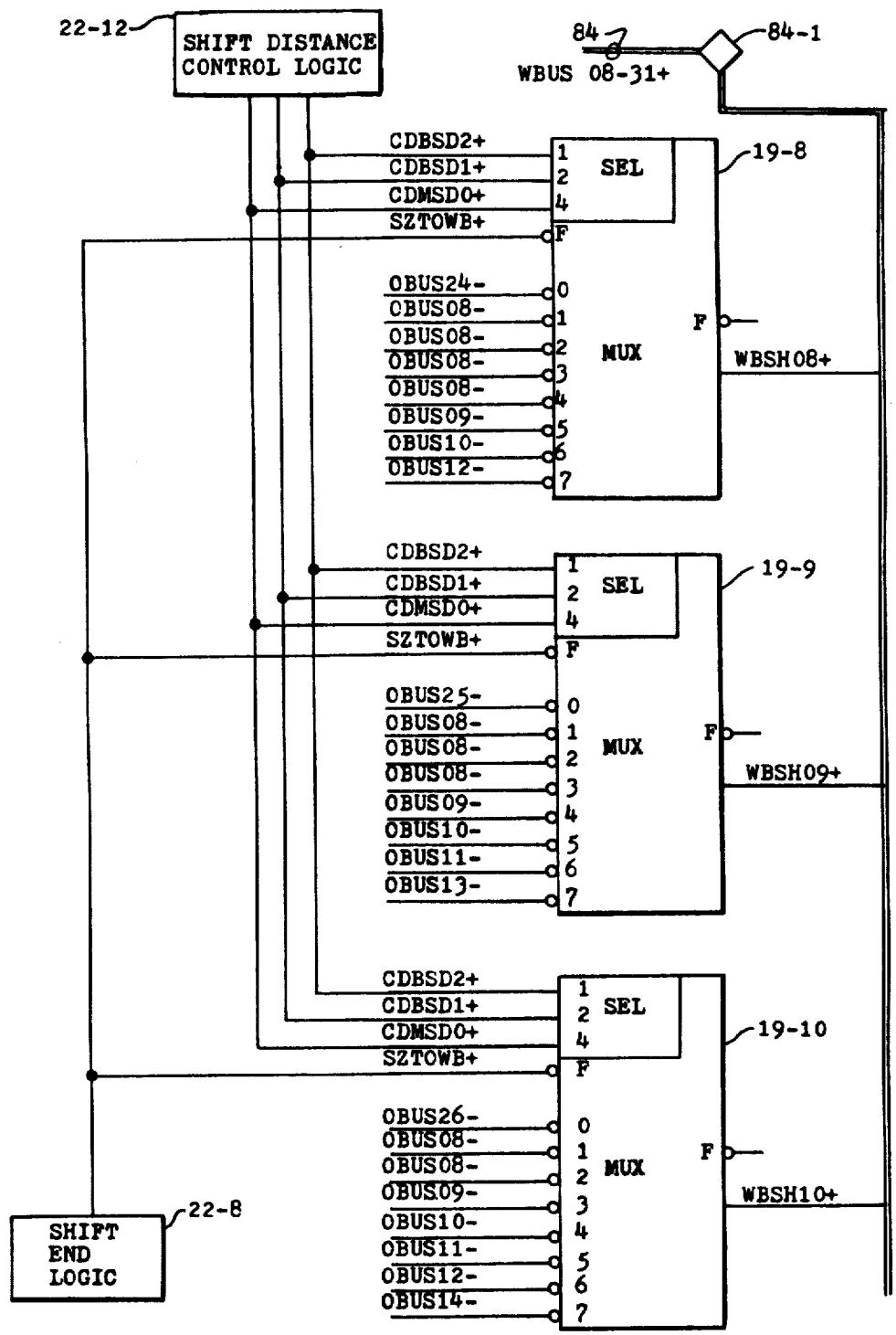
FIG. 8 is a logic diagram of the shifter multiplexers 19.
Figure 8:
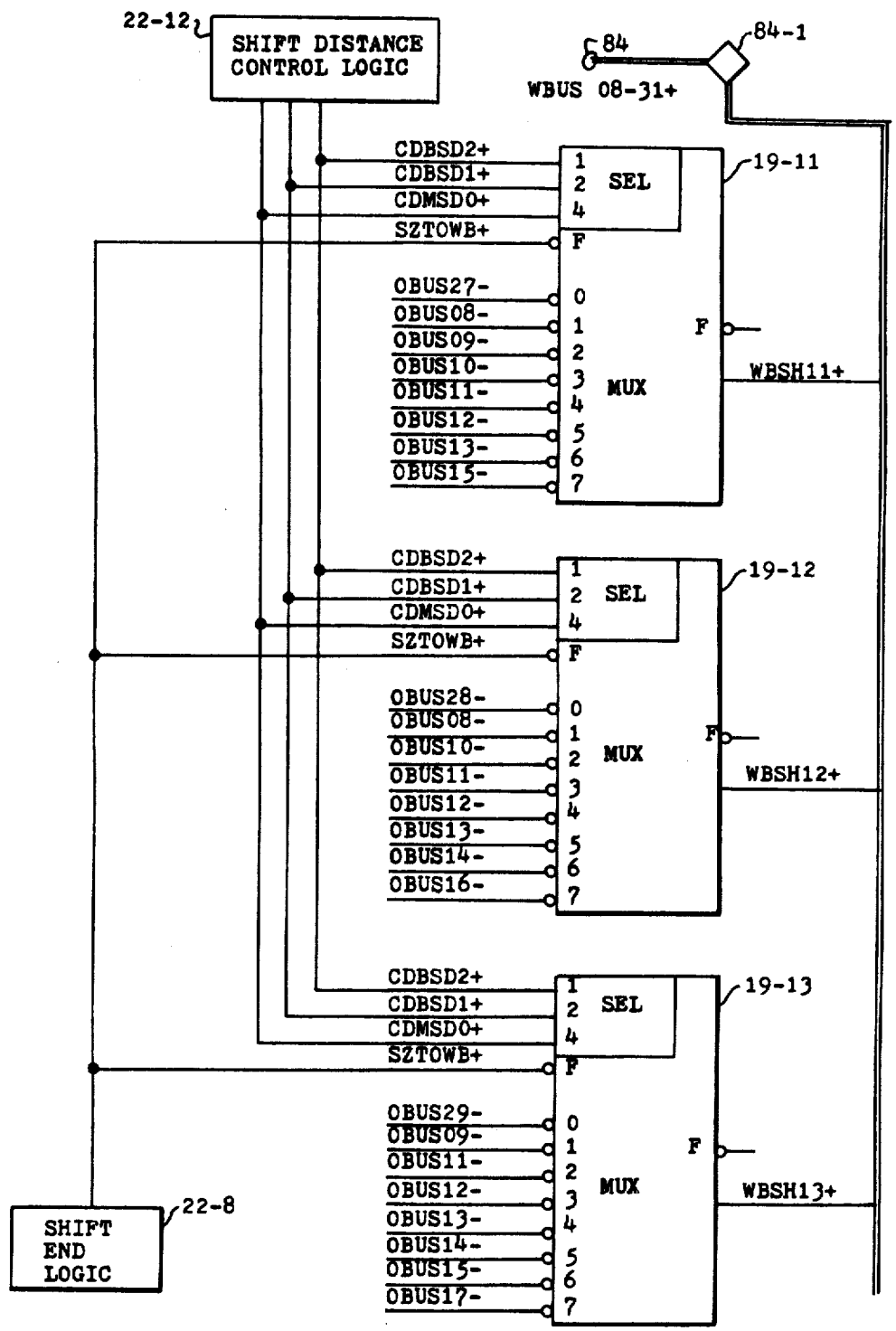
Figure 8:
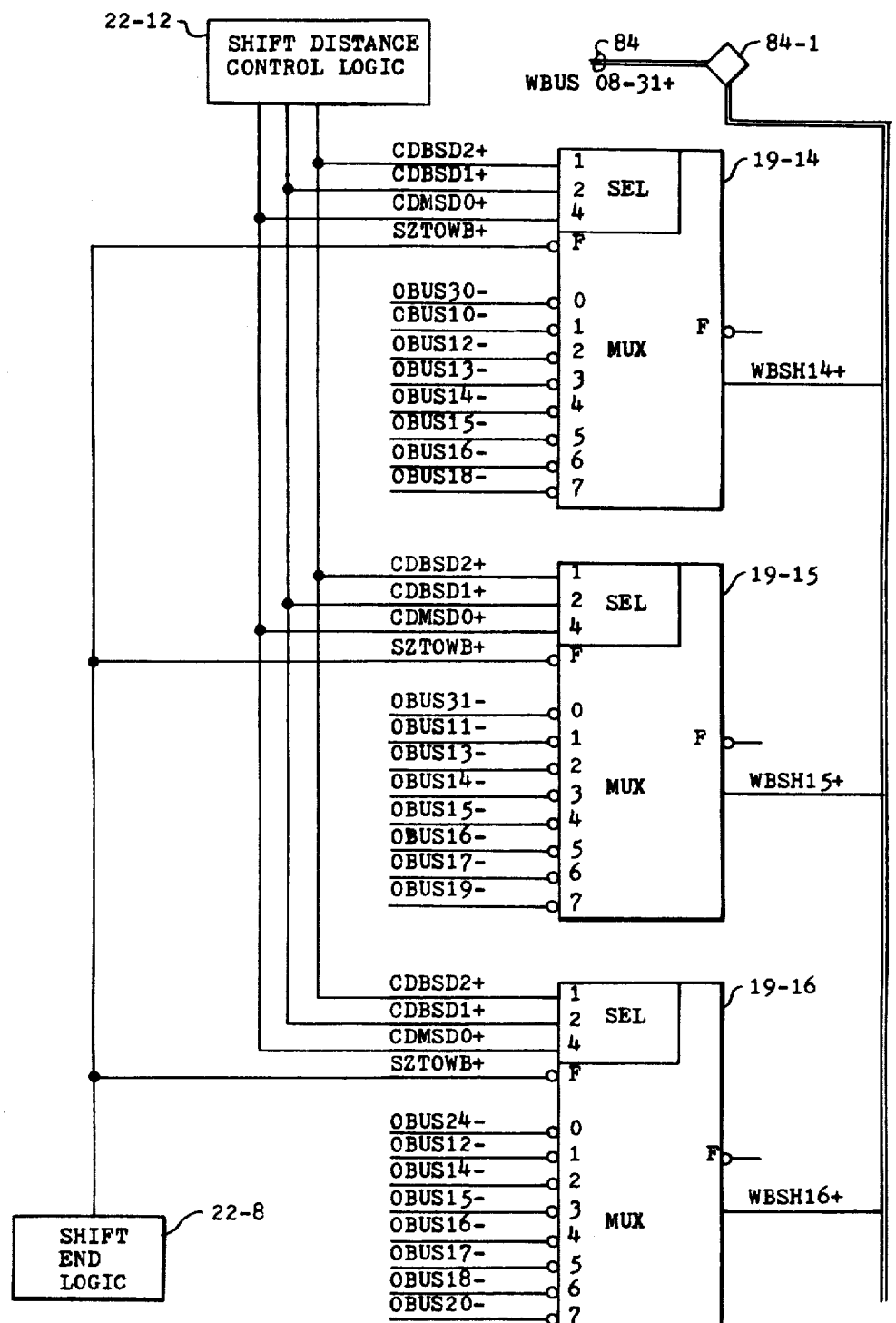
Figure 8:
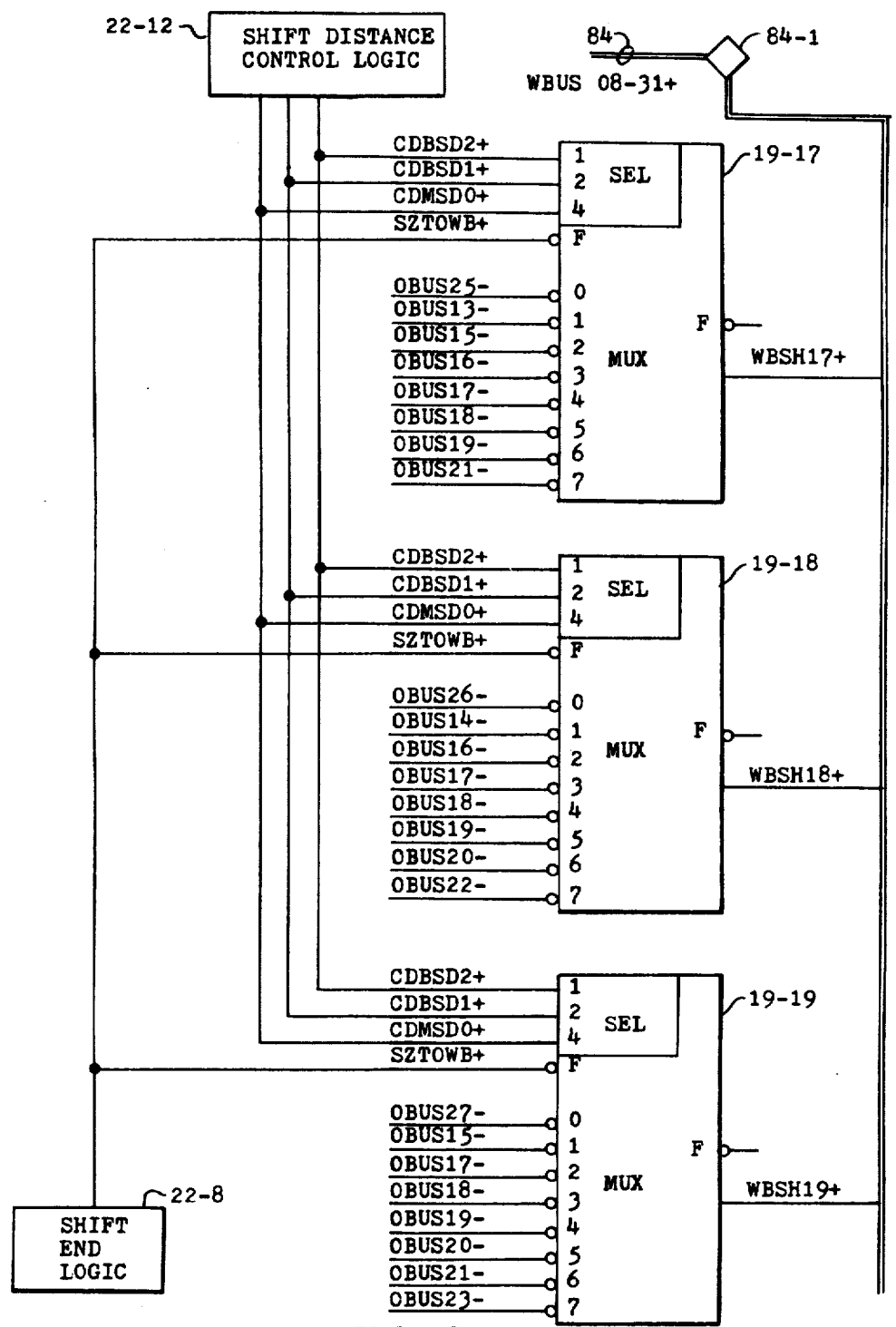
Figure 8:
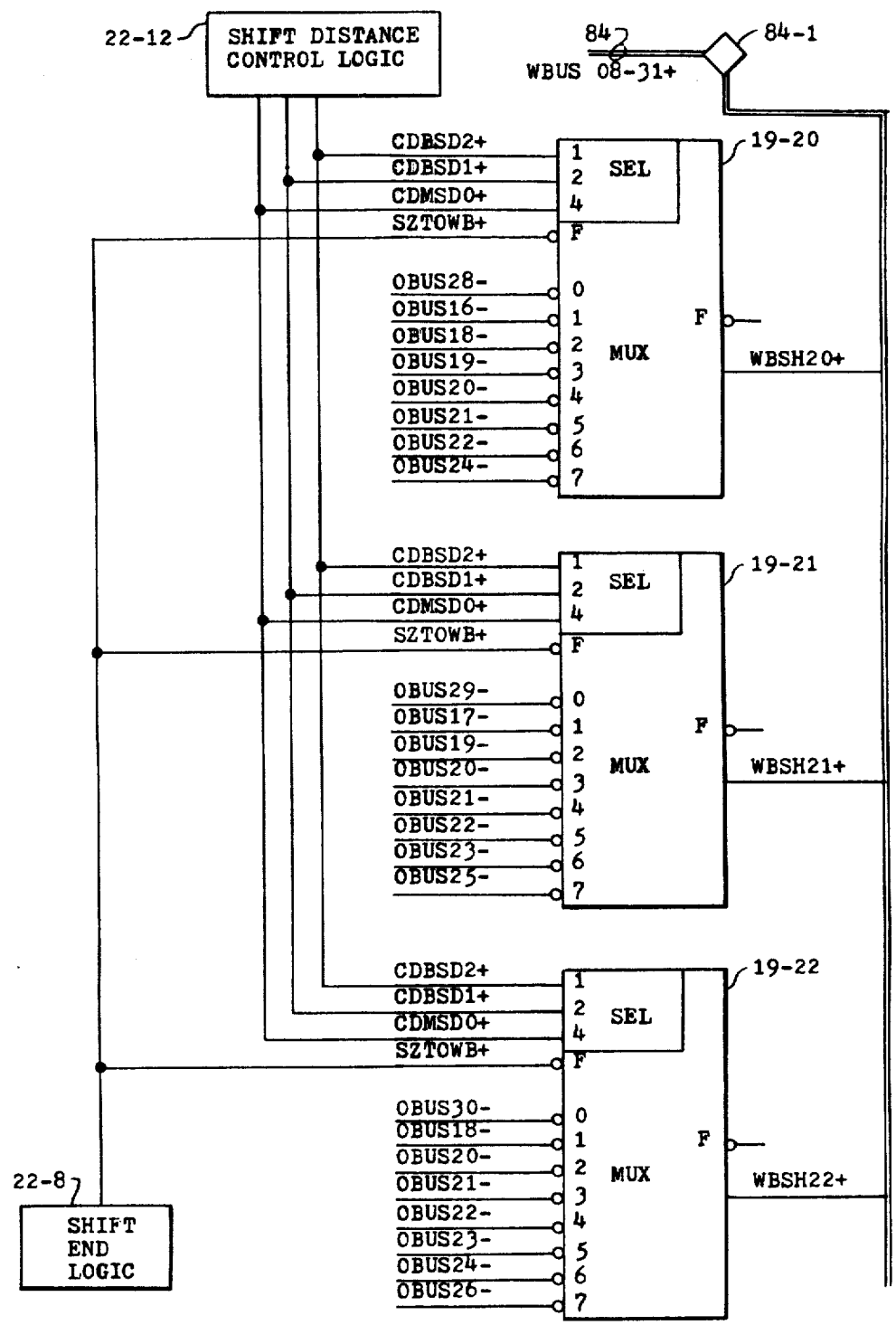
Figure 8:
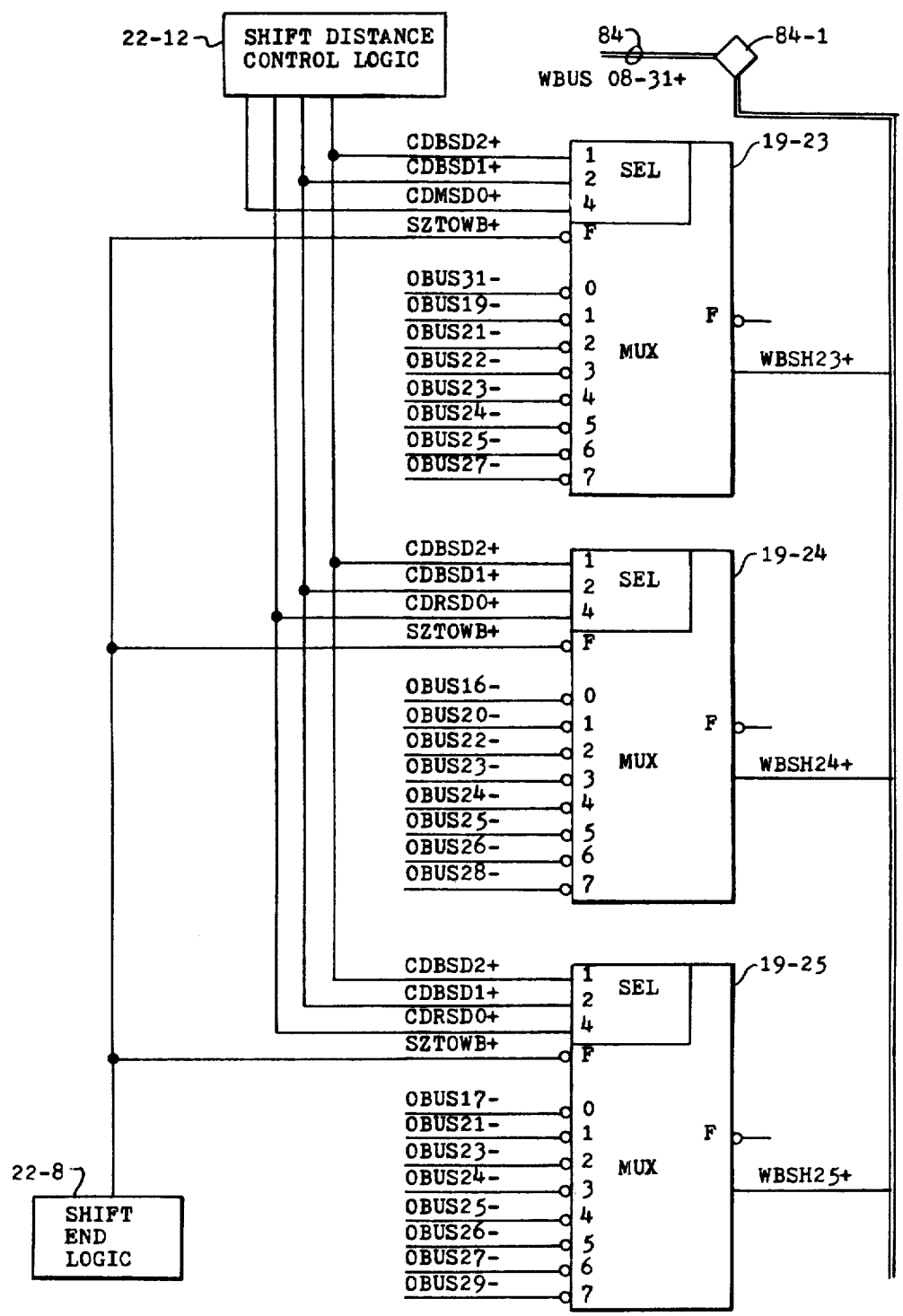
Figure 8:
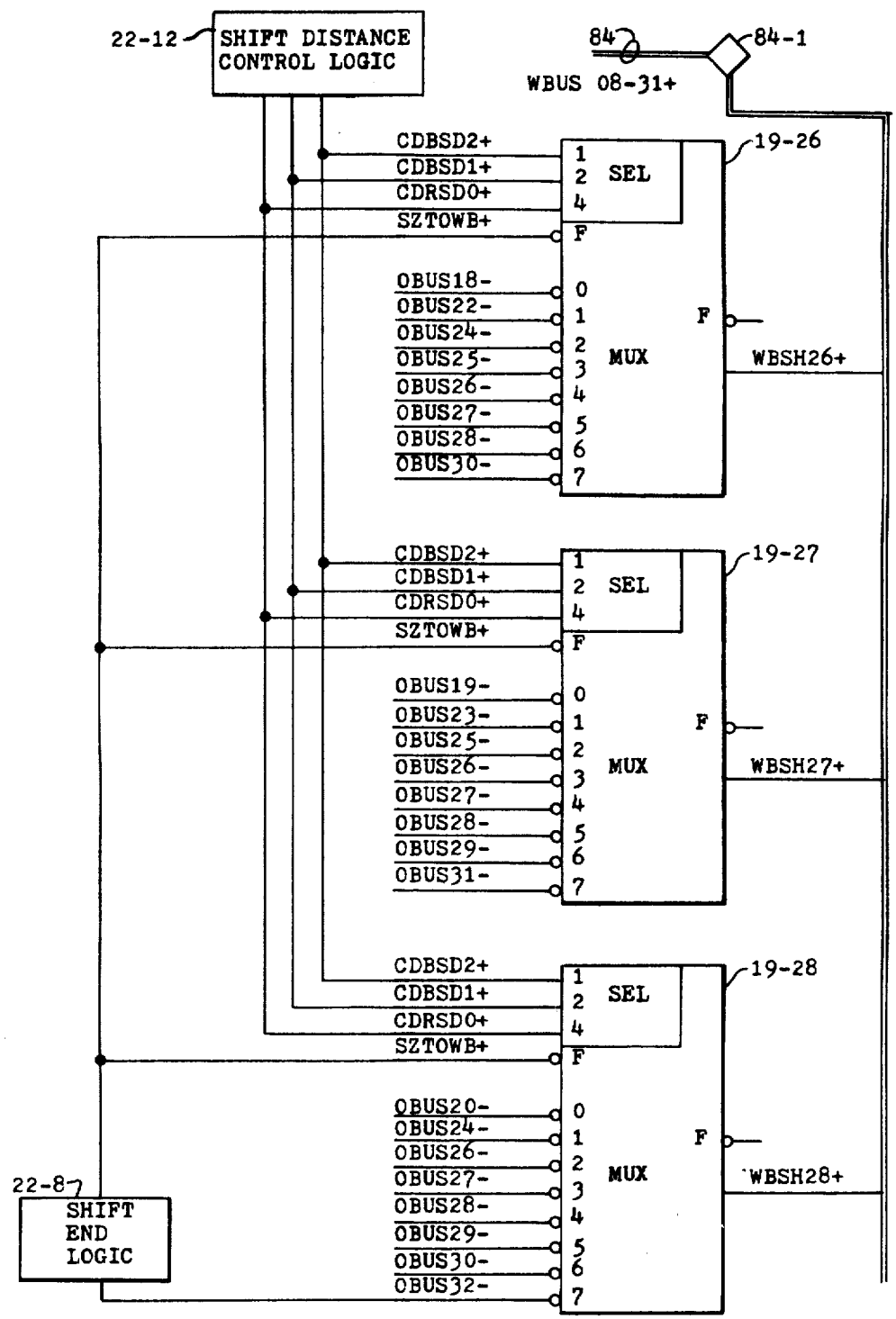
Figure 8:
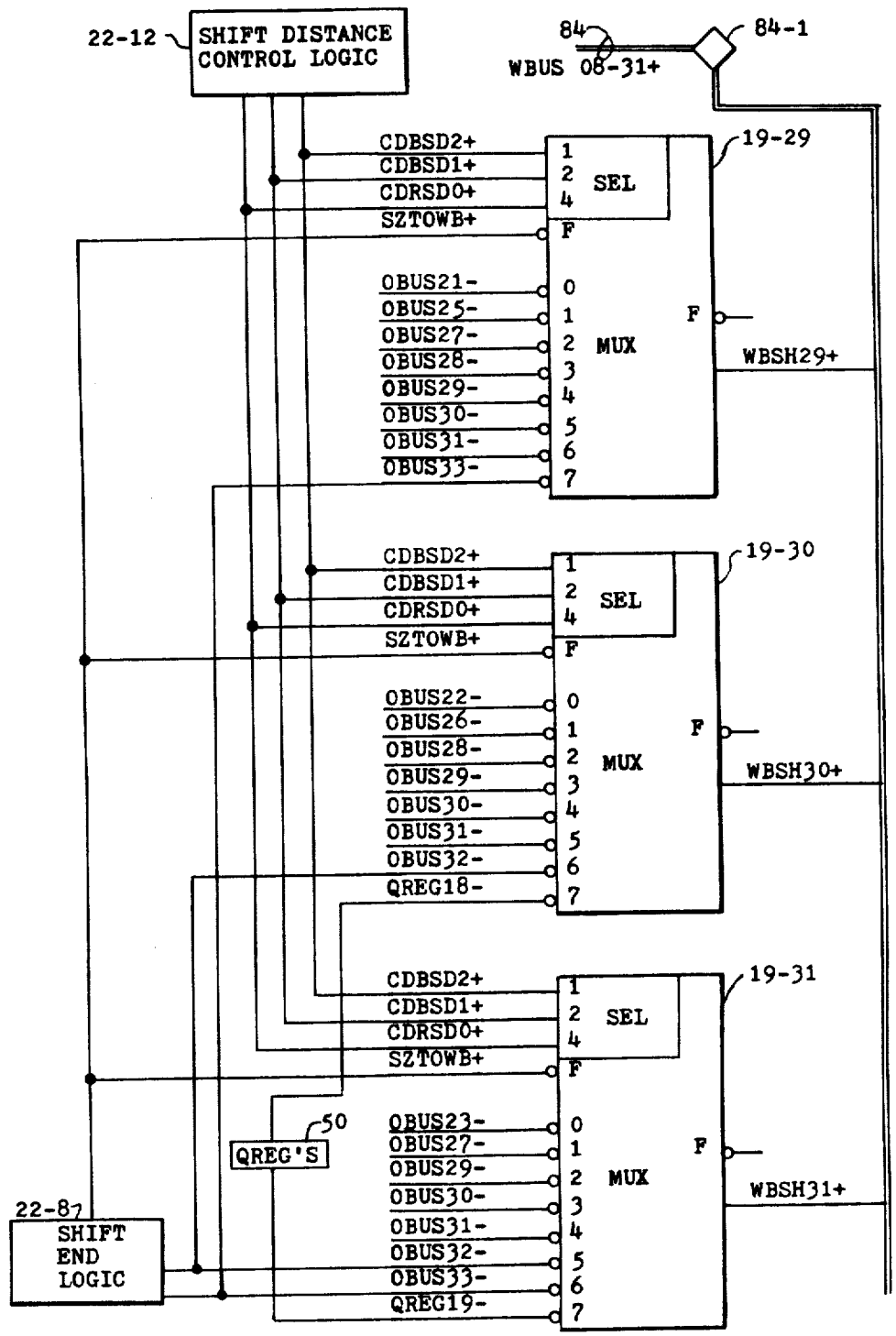

Referring to FIG. 8, the 24 multiplexers, MUX 19-8 through MUX 19-31, make up the shifter MUX's 19 of FIG. 5. These multiplexers couple the O bus 17 to the W bus 84. MUX 19-8 through MUX 19-31 receive the O bus 17 signals OBUS 08-31—, shift the signals either 0, 1, 2 or 4-bit positions to the left or right as specified by the select signals CDBSD1+, CDBSD2+, CDMSD0+ and CDRSD0+ as shown in FIG. 10. Select signals CDBSD2+ and CDBSD1+ are applied to the select terminals 1 and 2, respectively, of MUX 19-8 through MUX 19-31. Select signal CDMSD0+ is applied to the select terminal 4 of MUX 19-8 through MUX 19-23 and select signal CDRSD0+ is applied to the select terminal 4 of MUX 19-24 through MUX 19-31.

When select signals CDBSD2+ and CDBSD1+ are at logical ZERO, then shifter MUX's 19 is in a swap, twin or straight-through mode. Referring to FIG. 10, the "L" refers to bit positions 08 through 15, the "M" refers to bit positions 16 through 23, and the "R" refers to bit positions 24 through 31 (Left, Middle and Right).

In the swap mode, as shown on line h of FIG. 10, when signals CDMSD0+ and CDRSD0+ are at logical ZERO, signals OBUS 24-31— are applied to terminal 0 of MUX 19-8 through 19-15, respectively, and also applied to terminal 0 of MUX 19-16 through 19-23, respectively. Signals OBUS 08-15 are applied to MUX 19-24 through MUX 19-31, respectively. These signals pass through MUX 19-8 through MUX 19-31 to W bus 84 signal WBUS 08-31+ (RRM→LMR).

As shown on line i of FIG. 10, when select signal CDMSD0+ is at logical ZERO and select signal CDRSD0+ is at logical ONE, signal OBUS 24-31— are applied to terminal 0 of MUX 19-8 through MUX 19-15, respectively, terminal 0 of MUX 19-16 through MUX 19-23, respectively, and terminal 4 of MUX 19-24 through MUX 19-31, respectively, and appears on W bus 84 as RRR. This enables the CPU 100 to do byte manipulation when executing instructions on half word oerands.

O bus 17 signal OBUS 08— indicates the sign bit, binary ZERO indicating a plus sign and binary ONE indicating a minus sign. The sign bit signal OBUS 08— is applied to terminals 1, 2, 3 and 4 of MUX 19-8; terminals 1, 2 and 3 of MUX 19-9; terminals 1 and 2 of MUX 19-10; terminal 1 of MUX 19-11 and terminal 1 of MUX 19-12. A left shift results in the sign bit being lost since terminals 5, 6 or 7 of MUX 19-8 through MUX 19-12 are operative. Terminal 5 is operative during a 1-bit shift left by transferring O bus 17 signals OBUS 09— through OBUS 13— to the W bus 84 signals WBUS 08+ through WBUS 12+, respectively. Terminal 6 is operative during a 2-bit left shift by transferring signals OBUS 10— through OBUS 14— to the W bus 84 signals WBUS 08+ through WBUS 12+, respectively. Terminal 7 is operative during a 4-bit left shift by transferring signals OBUS 12— through OBUS 16— to the W bus 84 signals WBUS 08+ through WBUS 12+, respectively.

During a right shift of 1, 2 or 4-bit positions, the sign is repeated for the number of bit positions shifted. For a 1-bit right shift, terminal 3 is operative transferring the sign bit signal OBUS 08— through MUX 19-8 and MUX 19-9, and signals OBUS 09— through OBUS 11— through MUX 19-10 through MUX 19-12, respectively. For a 2-bit right shift, terminal 2 is operative transferring the sign bit, signal OBUS 08— through MUX 19-8 through MUX 19-10 and signals OBUS 09— and OBUS 10— through MUX 19-11 and MUX 19-12, respectively. For a 4-bit right shift, terminal 1 is operative transferring the sign bit signal OBUS 08— through MUX 19-8 through MUX 19-12 and transferring signal OBUS 09— through MUX 19-13.

During a 4-bit right open shift, FIG. 10, line a, terminals 1 of MUX 19-8 through MUX 19-31 are operative and signals OBUS 09— through OBUS 27— are shifted to W bus 84 signals WBUS 13+ through WBUS 31+ by MUX 19-13 through MUX 19-31. The sign bit signal OBUS 08— is transferred to signals WBUS 08+ through WBUS 12+. Since signals OBUS 12— through OBUS 15— are forced to logical ZERO by the MUX 20-6 selecting the logical ONE input terminal 1, signals WBUS 16+ through WBUS 19+ are forced to logical ZERO. Signals OBUS 28— through OBUS 31— are lost.

During a 4-bit left open shift, FIG. 10, line g, terminals 7 of MUX 19-8 through MUX 19-31 are active. Signal OBUS 12— through signal OBUS 31— are shifted to W bus 84 signals WBUS 08+ through WBUS 27+ by MUX 19-8 through MUX 19-27. Signals OBUS 08— through OBUS 12— are lost. Signals OBUS 32—, OBUS 33—, QREG 18— and QREG 19— applied to terminals 7 of MUX 19-28 through MUX 19-31, respectively, are at logical ZERO, forcing signals WBUS 28+ through WBUS 31+ to logical ZERO. Signal QRLDEN—, the input to NAND gates 22-64 and 22-66, FIG. 7, at logical ONE during a left open shift, forces signals OBUS 32— and OBUS 33— to logical ZERO. Also, signal QRLOAD—, the output of NAND gate 22-98, at logical ONE prevents the loading of the Q register 50, forcing the output signals QREG 18— to and QREG 19— to to logical ONE.

The 2-bit and 1-bit left open shifts, FIG. 10, lines f and e, operate in a similar manner to the 4-bit left open shift. During the 2-bit left open shift, terminals 6 of MUX 19-8 through MUX 19-31 are operative and during the 1-bit left open shift, terminals 5 are operative. Similarly, for the 2-bit and 1-bit right open shift, FIG. 10, lines b and c, terminals 2 and 3 respectively of MUX 19-8 through MUX 19-31 are operative.

Figure 9:
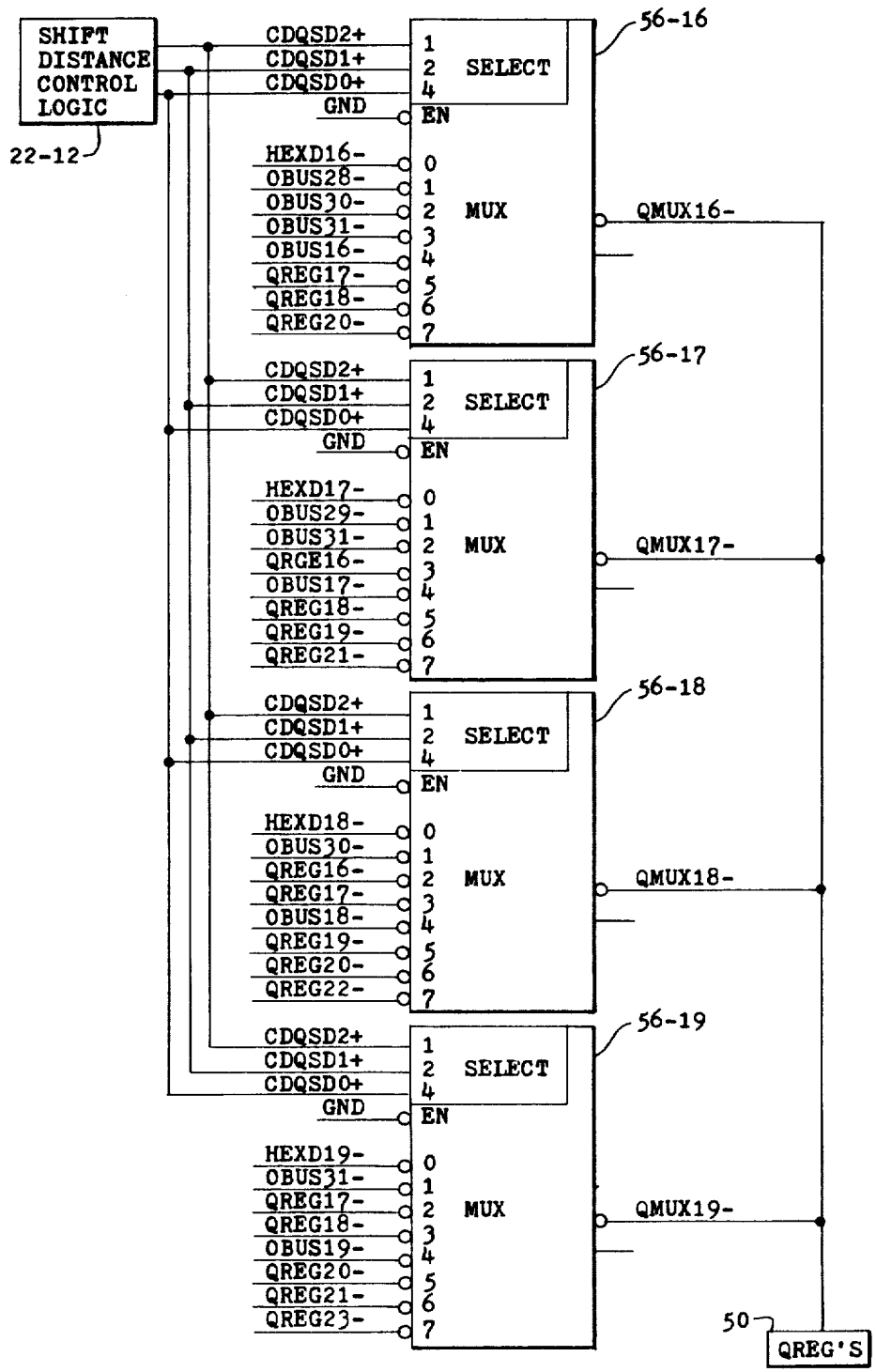
FIG. 9 is a logic diagram of the Q shifter multiplexers 56.
Figure 9:
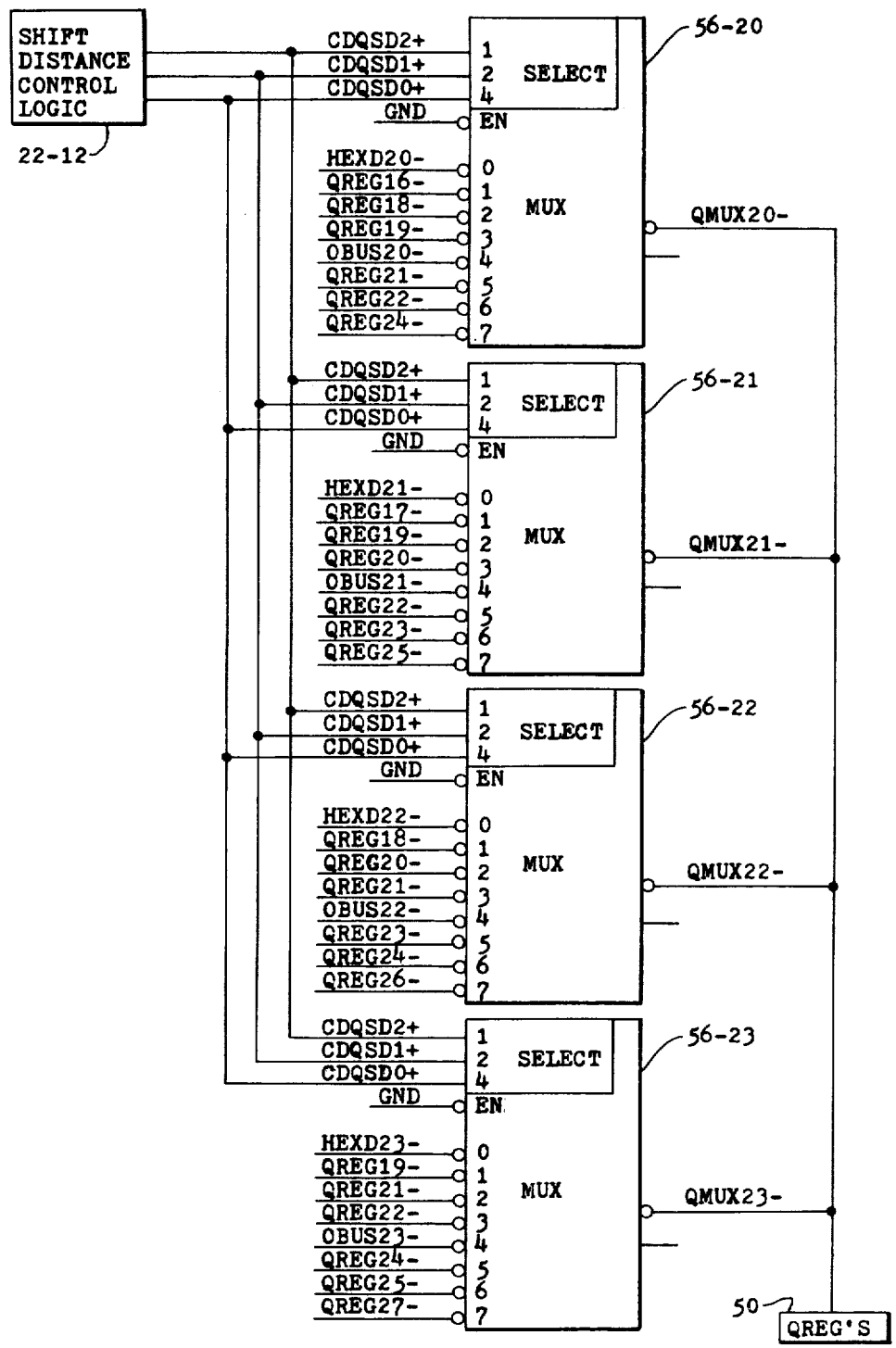
Figure 9:
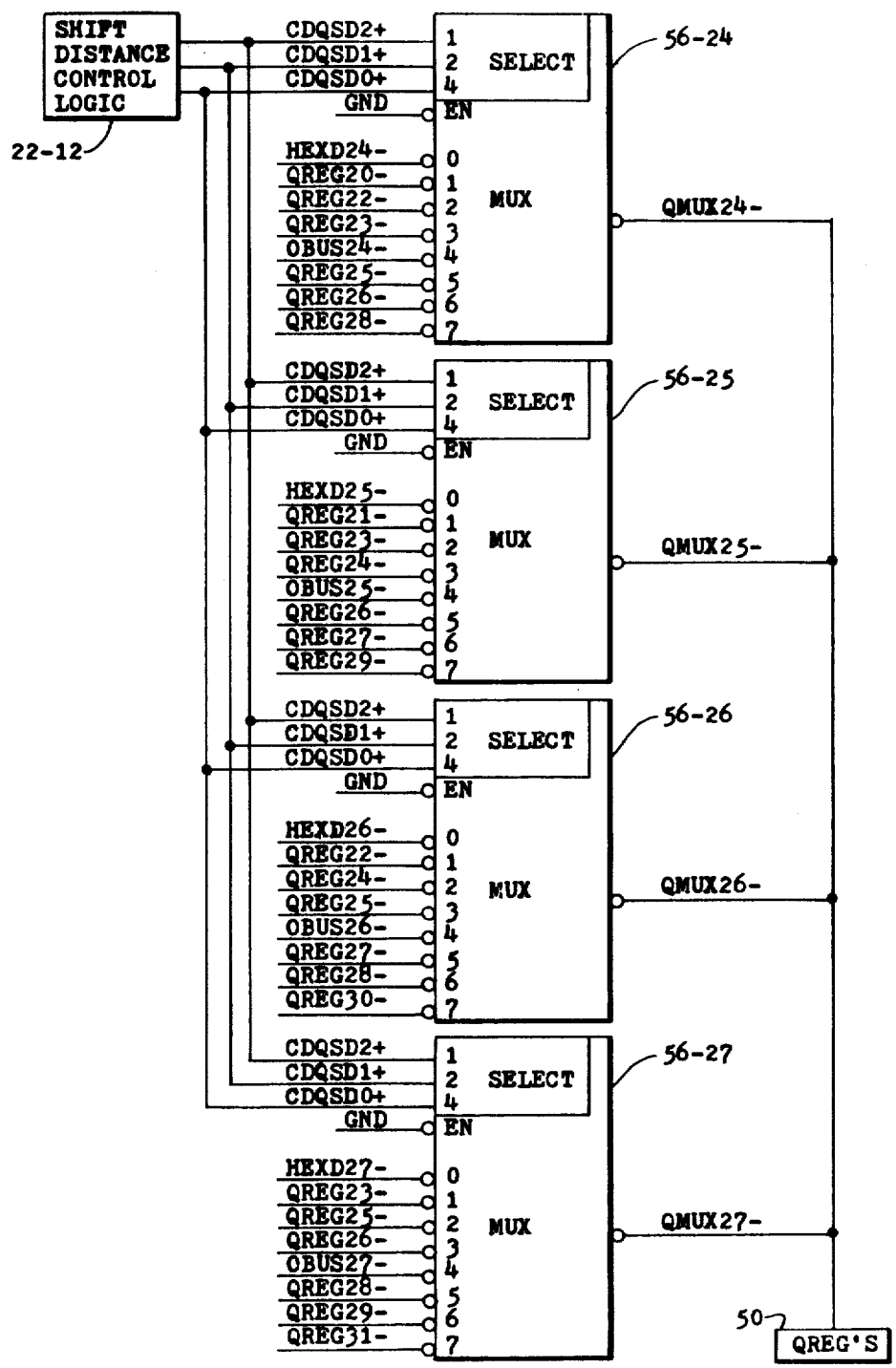
Figure 9:
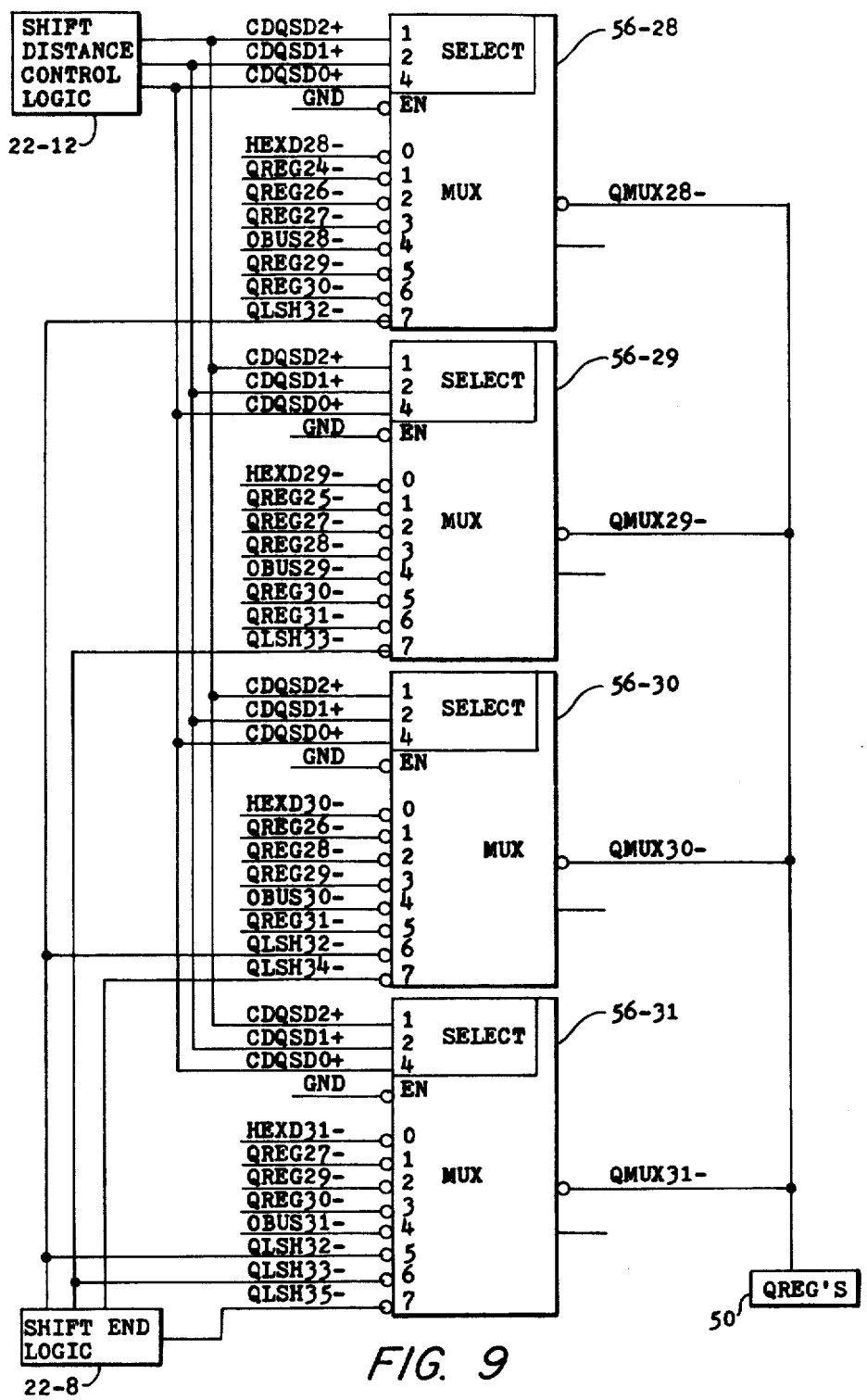

Referring to FIG. 9, the Q shifter MUX's 56 includes 16 multiplexers, MUX 56-16 through MUX 56-31. The Q register 50 and the Q shifter MUX's 56 are 16-bit extensions of the shifter MUX's 19 during the execution of right shift operations.

Shift select control signals CDQSD2+, CDQSD1+ and CDQSD0+ are generated in shift distance control logic 22-12 and are applied to the 1, 2 and 4 select terminals of MUX 56-16 through MUX 56-31, respectively. Note that from FIG. 6, signals CDQSD2+ and CDBSD2+ are functionally identical, and signals CDQSD0+ and CDMSD0+ are functionally identical. However, signals CDQSD1+ and CDBSD1+ are not functionally identical.

Signals CDQSD2+, CDQSD1+ and CDQSD0+ at logical ZERO select terminal 0 of MUX 56-16 through MUX 56-31 for loading the output of the decoder 59, FIG. 5, signals HEXD 16-31— into the Q registers 50 via signals QMUX 16— through QMUX 31— during the address generation operation.

Signals CDQSD2+ and CDQSD1+ at logical ZERO and signal CDQSD0+ at logical ONE select terminals 4 of MUX 56-19 through MUX 56-31 to load the O bus 17. Signals OBUS 16— to through OBUS 31— load directly into the Q registers 50.

As in MUX 19-8 through MUX 19-31, the control signals CDQSD2+, CDQSD1+ and CDQSD0+ select terminal 1 of MUX 56-16 through MUX 56-31 for a 4-bit right shift, terminal 2 for a 2-bit right shift, terminal 3 for a 1-bit right shift, terminal 5 for a 1-bit left shift, terminal 6 for a 2-bit left shift and terminal 7 for a 4-bit left shift.

During the 32-bit right open or circular shift operation, the right end of shifter MUX's 19 is coupled to the left end of Q shifter MUX's 56. Signals OBUS 28—, OBUS 29—, OBUS 30— and OBUS 31— are applied to terminals 1 of MUX 56-16 through MUX 56-19, respectively, for the 4-bit right shift operation. This results in signals OBUS 28— through OBUS 31— appearing on Q register 50 input signals QREG 16— through QREG 19—, respectively.

Signals OBUS 30— and OBUS 31— are applied to terminals 2 of MUX 56-16 and MUX 56-17 for the 2-bit right shift operation, and signal OBUS 31— is applied to the terminal 3 of MUX 56-16 for the 1-bit right shift operation.

During the 32-bit open, arithmetic or circular left shift operation, signals OBUS 32—, OBUS 33—, QREG 18— and QREG 19— are applied to terminals 7 of MUX 19-28 through MUX 19-31, respectively, for the 4-bit left shift operation. As described supra, referring to FIG. 7, signal QRLDEN-enables NAND gates 22-64 and 22-66 to generate signals OBUS 32— and OBUS 33— from signals QREG 16— and QREG 17—, respectively, when Q registers 50 is enabled. This places signals QREG 16— through QREG 19— on W bus 84 signals WBUS 28+ through WBUS 31+. Similarly, signals OBUS 32— and OBUS 33— are applied to terminal 6 of MUX 19-30 and MUX 19-31 for the 2-bit left shift operation, and signal OBUS 32— is applied to terminal 5 of MUX 19-31 for the 1-bit left shift operation.

During the 32-bit shift operation, signals QLSH 32—, QLSH 33—, QLSH 34— and QLSH 35— are applied to terminals 7 of MUX 56-28 through MUX 56-31 for the 4-bit left shift. Referring to FIG. 7, signals OBUS 16— or a signal DALU 08+ from the DALU 15 generates signal QLSH 32—. Signal MISCIA+ at logical ONE is applied to an EXCLUSIVE OR gate 22-74 to generate signal QUOBIT—. Signal QUOBIT— is operative during the execution of a multiply or divide instruction to be applied as signal QLSH 32— to terminal 5 of MUX 56-31 during the 1-bit left shift operation. Signal QUOBIT— indicates the sign of the partial product or the sign of the result of a subtraction when developing the quotient. Signals FSHIN2— and FSHIN2+ control the NOR/AND gate 22-76 to select either signal OBUS 16— or QUOBIT—. The output signal SHENDQ— at logical ZERO enables NAND gate 22-78 to generate signal QLSH 32—. NAND gates 22-92, 22-94 and 22-96 are enabled by signal CDCIRC— from decoder 22-84 to generate signals QLSH 33—, QLSH 34— and QLSH 35— from signals OBUS 17—, OBUS 18— and OBUS 19—, respectively. This transfers signals OBUS 16— through OBUS 19— into Q registers 50 via signals QMUX 28— through QMUX 31— during the 4-bit circular left shift. Similarly, signals QLSH 32— and QLSH 33— are applied to terminals 6 of MUX 56-30 and MUX 56-31 for the 2-bit circular left shift operation, and signal QLSH 32— is applied to terminal 5 of MUX 56-31 for the 1-bit circular left shift operation.

The contents of the I register 57 containing the software visible flags are applied to the O bus 17 signals OBUS 24— through OBUS 31— via drivers 20-8 and 20-10 and applied to terminals 0 of MUX 19-15 through MUX 19-23, and MUX 19-24 through MUX 19-31 for transfer twinned to W bus 84 signals WBUS 16+ through WBUS 31+. Signals WBUS 08+ through WBUS 15+ are immaterial for this operation.

For the 32-bit circular right shift operation, with signals FSHIN1+ and OBQREN— applied to MUX 20-6 at logical ZERO, the signals QREG 28— through QREG 31— are applied through MUX 20-6, FIG. 5, to O bus 17 signals OBUS 12— through OBUS 15—, respectively, via wired OR 17-2 and signals OBQR 12-15—. For a 1-bit circular right shift, signal QREG 31— is applied to W bus 84 signal WBUS 16+ via signal OBUS 15— and terminal 3 of MUX 19-16. For a 2-bit circular right shift, signals QREG 30— and QREG 31— generate signals OBUS 14— and OBUS 15— which are applied to terminal 2 of MUX 19-16 and MUX 19-17 for transfer onto W bus 84 signals WBUS 16+ and WBUS 17+. For a 4-bit circular right shift, signals QREG 28— through QREG 31— generate signals OBUS 12— through OBUS 15— which are applied to terminals 1 of MUX 19-16 through MUX 19-19 for transfer into W bus 84 signals WBUS 16+ through WBUS 19+.

For the 32-bit right open shift, signal FSHIN1+ at logical ONE selects terminal 1 of MUX 20-6. The high signals applied to terminal 1 force the OBUS 12— through OBUS 15— signals to logical ZERO, thereby forcing terminal 3 of MUX 19-16, terminal 2 of MUX 19-16 and MUX 19-17, and terminals 1 of MUX 19-16 through MUX 19-19 to logical ZERO for 1, 2 or 4-bit right open shifts, respectively.

Signal OBQREN−, the output of NAND gate 22-8, FIG. 7, is forced to logical ZERO by signals CRSHF1+ and FSHIN2+, thereby enabling MUX 20-6. Note that this disables MUX 20-4 by forcing signal SSOBLF− to logical ONE.

The P register 23 signals PCTR 08-31+ and the YCTR 08-31+ signals are applied to terminals 0 and 1, respectively, of the 16 MUX's 21 which is enabled by signal YPTOOB−. Signal YPTOOB− is generated by the shift signals CRSHF2−, CRSHF3+ and CRSHF4− applied to NAND gate 22-70. Shift signal CRSHF0+ selects the 0 terminals or the 1 terminals of MUX's 21. The output signals OBYP 08-31− are applied to shifter MUX's 19 via wired OR 17-2 and O bus 17. The signals are transferred to the W bus 84 without shifting or shifted 1 bit position to the left in order to align the internal address signals from the P register 23 or the Y register 24 with addresses as transmitted as data on the megabus 105, FIG. 1.

The shifter MUX's 19 and the Q shifter MUX's 56 are used in the development of the address location of an operand stored in memory 106. The address is developed by adding an index value that is stored in DRAM 11 which must be scaled to the base address stored in BRAM 12 and storing the result in the Y register 24. The index value appears on the R bus 13 with the word address binary point aligned to the right (if the operand is more than one word in length) or left (if the operand is less than one word in length) of the bit 31 position of shifter MUX's 19. If the operand is made up of bits, then as shown in FIG. 10 the index value must be shifted 4 bit positions to the right. If the operand is made up of 4 bit digits or 8 bit half words, the index value must be shifted 2 or 1 bit positions, respectively, to the right. The shifted-out index value bits indicate the position within the operand of the selected digit or half word.

For the double word or quad word (4 words), the index value must be shifted 1 bit position left or 2 bit positions left, respectively, and 1 zero bit or 2 zero bits are forced into the rightmost positions of the index value.

As an example, assume an operand is made up of bits. The firmware will indicate a scaled shift of the index value. Signals ODSIZ4+, ODSIZ2+ and ODSIZ1+ applied to driver 22-42 and drive 22-46 will force select signals CDBSD2+ and CDQSD2+ to logical ONE and select signals CDRSD0+, CDQSD0+, CDBSD1+, CDQSD1+ and CDMSD0+ to logical ZERO, thereby selecting terminals 1 of MUX 19-8 through MUX 19-31 and MUX 56-16 through MUX 56-31. This will shift the index value signals OBUS 08− through OBUS 27− on W bus 84 for storage in the Y register 24, and signals OBUS 28− through OBUS 31− through MUX 56-16 through MUX 56-19 for storage in the XB register 58, FIG. 5.

The XB register 58 is enabled by signal XBCLOK+ from control store 80 and stores signals QMUX 16− through QMUX 19− on a first firmware cycle. Signal XBCLOK+ is generated from control store bits GP 67 and GP 71 of FIG. 4.

Signals XBREG 0+ through XBREG 3+ are also applied to the 4 to 16 decoder 59 on a second firmware cycle. The output signals HEXD 16-31 are stored in Q register 50 via terminal 0 of MUX 56-16 through MUX 56-31 and, subsequently in a third firmware cycle, sent out on the I bus 14. This resulting mask allows the software to select and manipulate a particular index-selected bit of the addressed word.

An operand containing a word of 4 digits will generate a right shift of 2 bit positions. Signal OBUS 30− and OBUS 31− are applied to terminals 2 of MUX 56-16 and MUX 56-17 for storage in the XB register 58. The decoder 59 will generate one of four signals for storage in the Q register 50 selecting a digit in the operand word. Similarly, an operand containing a word of 2 half words will generate a right shift of 1 bit position, resulting in decoder 59 generating one of two signals selecting the half word. Note from FIG. 10 that the index value for a full word is not shifted, the double word shifted one bit position left and the quad word shifted two bit positions left. Shifting left results in binary ZERO bits being shifted into the right end of the index value via MUX 19-31 terminal 5 signal OBUS 32− for the 1 bit left shift and terminals 6 of MUX 19-30 and MUX 19-31 signals OBUS 32− and OBUS 33−.

MUX 19-08 through MUX 19-31 are 74S251 circuits and MUX 56-16 through MUX 56-31 are 74S151 circuits. The 74S251 circuits have a high impedance output when disabled by signal SZTOWB+ applied to the enable terminal F. The 74S151 circuits are enabled by a ground signal, logical ZERO. The Q registers 50 are 74S374 circuits. The MUX's 20-2, 21 and 20-4 are 74S258 circuits and the MUX 20-6 is a 74S257 circuit. The drivers 20-8 and 20-10 are 74S240 circuits. The drivers 22-42, 22-44, 22-46 and 22-48 are 74S241 circuits. The flops 22-14 through 22-20 are 74S74 circuits.

Having shown and described a preferred embodiment of the invention, those skilled in the art will realize that many variations and modifications may be made to affect the described invention and still be within the scope of the claimed invention. Thus, many of the elements indicated above may be altered or replaced by different elements which will provide the same result and fall within the spirit of the claimed invention. It is the intention, therefore, to limit the invention only as indicated by the scope of the claims.

What is claimed is:

1. A central processing unit for receiving instruction signals and operand signals from a memory subsystem and performing a shifting operation on said operand signals in accordance with said instruction signals, said central processing unit comprising:

a control store responsive to said instruction signals for generating a plurality of control signals;

shift distance control means including storage means responsive to a first plurality of said plurality of control signals for generating a plurality of shift control signals, and logic means responsive to said plurality of shift control signals for generating a plurality of shift signals indicative of a number of bit positions said operand signals are shifted during said shifting operation;

selector means coupled to a first bus for storing said operand signals received from said memory subsystem and responsive to said plurality of shift control signals for generating a plurality of first bus signals representative of said operand signals for transfer over said first bus;

shifting means coupled to said first bus and receiving said plurality of first bus signals representative of a first operand word and responsive to said plurality of shift signals in a first state for generating a plurality of multiplexer signals representative of said first operand word;

register means responsive to said plurality of shift control signals for storing said plurality of multiplexer signals and generating a plurality of register signals during a first cycle of said control store operation;

said shifting means further receiving said plurality of first bus signals representative of a second operand word and said plurality of register signals representative of said first operand word and responsive to said plurality of shift signals in a second state for transferring said second operand word to a second bus and generating a plurality of second bus signals shifted from said first bus signals and generating said plurality of multiplexer signals shifted from said register signals by the number of bit positions specified by said plurality of shift signals in said second state during a second cycle of said control store operation; and shift end means for receiving a plurality of first end signals of said plurality of first bus signals representative of said second operand word and a plurality of second end signals of said plurality of register signals and responsive to a second plurality of control signals indicative of a type of shift and said plurality of shift control signals for generating first shift end signals representative of said plurality of first end signals and second shift end signals representative of said plurality of second end signals when said second plurality of control signals indicates a circular shift, and generating said first and said second shift end signals at binary ZERO when said second plurality of control signals indicates an open shift;

said shifting means being responsive for shifting said first shift end signals for generating said plurality of multiplexer signals and shifting said second shift end signals for generating said plurality of second bus signals during said second cycle of operation wherein said plurality of second bus signals and said plurality of multiplexer signals are shifted from said plurality of first bus signals and said plurality of register signals by the number of bit positions specified by said plurality of shift signals in said second state.

2. The central processing unit of claim 1 wherein said shift distance control means comprises:

said storage means including a plurality of flip-flops responsive to said first plurality of control signals for generating said plurality of shift control signals including a left shift signal indicating a left shift operation; and said logic means responsive to said plurality of shift control signals for generating said plurality of shift signals including a first and a second plurality of shift signals.

3. The central processing unit of claim 2 wherein said shifting means comprises:

first shifting means for receiving said plurality of first bus signals representative of said first operand word and responsive to a first plurality of shift signals in said first state for generating said plurality of multiplexer signals during said first cycle of operation and receiving said plurality of multiplexer signals and responsive to said first plurality of shift signals in said second state for generating said plurality of multiplexer signals shifted the number of bit positions specified by said first plurality of shift signals in said second state during said second cycle of operation; and second shifting means for receiving said plurality of first bus signals representative of said second operand word and responsive to a second plurality of shift signals for generating said plurality of second bus signals shifted the number of bit positions specified by said second plurality of shift signals during said second cycle of operation wherein said first plurality of shift signals in said second state and said second plurality of shift signals both specify the same number of bit positions shifted.

4. The central processing unit of claim 3 wherein said first shifting means comprises:

a plurality of first multiplexers, each of said plurality of first multiplexers generating one of said plurality of multiplexer signals and said each of said plurality of first multiplexer having a plurality of first input select terminals responsive to said first plurality of shift signals for selecting one of said plurality of first input terminals, said plurality of first bus signals being coupled to a predetermined one of said plurality of input terminals of each of said plurality of first multiplexers for generating said plurality of multiplexer signals shifted zero bit positions from said plurality of first bus signals.

5. The central processing unit of claim 4 wherein said each of said plurality of first multiplexers having said plurality of register signals coupled to said plurality of first input terminals and responsive to said first plurality of shift signals for selecting one of said plurality of first input terminals for generating said plurality of multiplexer signals shifted 1, 2 or 4 bit positions left or right as specified by said first plurality of shift signals.

6. The central processing unit of claim 5 wherein said second shifting means comprises:

a plurality of second multiplexers, each of said plurality of second multiplexers generating one of said plurality of second bus signals and said each of said plurality of second multiplexers having a plurality of second input select terminals responsive to said second plurality of shift signals for selecting one of said plurality of second input terminals, said plurality of first bus signals being coupled to said plurality of second input terminals and responsive to said second plurality of shift signals for selecting one of said plurality of second input terminals for generating said plurality of second bus signals shifted 0, 1, 2 or 4 bit positions left or right as specified by said second plurality of shift signals.

7. The central processing unit of claim 6 wherein said plurality of second multiplexers includes a left group, a middle group and a right group of 8 of said second multiplexers each, said second plurality of shift signals including a third plurality of shift signals applied to said second input select terminals of said left and said middle groups and a fourth plurality of shift signals applied to said right group of said second multiplexers, said third and said fourth plurality of shift signals in a first state being applied to said second input select terminals select said plurality of second input terminals of said left group, said middle group and said right group to which are coupled a right group of said plurality of first bus signals to generate said plurality of second bus signals wherein said right group of said plurality of first bus signals is repeated three times, and said third and said fourth shift signals in a second state selecting said plurality of second input terminals wherein a middle group of said plurality of first bus signals is selected by said right group of second multiplexers and said right group of said plurality of first bus signals selected by said middle and said left groups of said second multiplexers to generate said plurality of second bus signals for performing a byte swapping and twinning operation.

8. The central processing unit of claim 7 wherein said shift end means comprises:
   a decoder responsive to said second plurality of control signals for generating a circular shift signal in a first state indicative of said circular shift and said open shift signal in a second state indicative of said open shift; and
   a plurality of AND gates responsive to said circular shift signal and said first shift end signal from the left end signals of said middle group of said plurality of first bus signals for generating said first end shift signals, for coupling with said plurality of first multiplexers wherein binary ZERO's are forced into the right end of said register means when said circular shift signal is in said second state and the left end signals of said middle group of said plurality of first bus signals are forced into the right end of said register means when said circular shift signal is in said first state and said plurality of said first shift signals indicate a left shift.

9. The central processing unit of claim 8 wherein said shift end means further comprises:
   a third multiplexer responsive to said second plurality of control signals in a first state and said plurality of shift control signals for receiving said plurality of second end signals from the right end of said register means and generating said second end shift signals coupled to said left group of said plurality of first bus signals for shifting into said middle group of said plurality of second multiplexers during a circular right shift, and responsive to said second plurality of control signals in a second state for generating said second end shift signals at binary ONE for shifting binary ZERO signals into said middle group of said plurality of second multiplexers during an open right shift.

10. The central processing unit of claim 9 wherein said first shifter means receiving said first bus signals representative of an index value further comprises:
    an index value register for receiving said plurality of multiplexers representative of said first bus signals being right shifted by a predetermined number of bit positions and generating a plurality of index value signals; and
    a decoder responsive to said index value signals for generating one of a plurality of decoder signals indicative of the position of the left portion of said operand signals stored in said memory subsystem for storage in said register means.

11. The central processing unit of claim 10 wherein said predetermined number of bit positions is 4 for a bit operand, 2 for a digit operand and 1 for a half word operand.

12. The central processing unit of claim 11 wherein said decoder generates 1 of 16 decoder signals for said bit operand, 1 of 4 decoder signals for said digit operand and 1 of 2 decoder signals for said half word operand.

* * * * *